(12) United States Patent
Norwell et al.

(10) Patent No.: US 11,474,909 B2
(45) Date of Patent: Oct. 18, 2022

(54) ON-DEMAND VIRTUALIZED DATA RECOVERY APPARATUSES, METHODS AND SYSTEMS

(71) Applicant: Datto, Inc., Norwalk, CT (US)

(72) Inventors: Arron Thomas Norwell, Medford, MA (US); Desmond Wayne Yeung, Dorchester, MA (US)

(73) Assignee: Kaseya Limited, Dublin (IE)

( * ) Notice: Subject to any disclaimer, the term of this patent is extended or adjusted under 35 U.S.C. 154(b) by 30 days.

(21) Appl. No.: 16/837,997

(22) Filed: Apr. 1, 2020

(65) Prior Publication Data
US 2021/0311837 A1 Oct. 7, 2021

(51) Int. Cl.
  *G06F 12/00* (2006.01)
  *G06F 11/14* (2006.01)
  *H04L 51/42* (2022.01)
(52) U.S. Cl.
  CPC ...... *G06F 11/1464* (2013.01); *G06F 11/1451* (2013.01); *G06F 11/1461* (2013.01); *G06F 11/1469* (2013.01); *H04L 51/42* (2022.05); *G06F 2201/84* (2013.01)
(58) Field of Classification Search
  CPC ............. G06F 11/1464; G06F 11/1451; G06F 11/1461; G06F 11/1469; G06F 2201/84; G06F 3/0646; G06F 3/0647; G06F 3/065; H04L 51/22
  See application file for complete search history.

(56) References Cited

U.S. PATENT DOCUMENTS

| | | | |
|---|---|---|---|
| 6,785,786 B1 | 8/2004 | Gold | |
| 6,847,984 B1 | 1/2005 | Midgley | |
| 9,235,582 B1 | 1/2016 | Madiraju Varadaraju | |
| 9,690,666 B1 | 6/2017 | Shembavnekar | |
| 9,811,422 B2 | 11/2017 | Bushman | |
| 10,204,016 B1 | 2/2019 | Patwardhan | |
| 10,210,162 B1 * | 2/2019 | Rees | G06F 3/0643 |
| 2005/0086443 A1 | 4/2005 | Mizuno | |
| 2010/0100696 A1 | 2/2010 | Suzuki | |
| 2011/0282841 A1 | 11/2011 | Saika | |

(Continued)

*Primary Examiner* — Shawn X Gu
(74) *Attorney, Agent, or Firm* — Maschoff Brennan

(57) ABSTRACT

The On-demand Virtualized Data Recovery Apparatuses, Methods and Systems ("OVDR") transforms data recovery request, mailbox backup data selection response inputs via OVDR components into mailbox backup data selection request, data recovery response outputs. A mailbox data recovery request datastructure associated with a user is obtained. Available mailbox backup data accessible to the user is determined. A selection of a subset of the available mailbox backup data to recover is obtained. A temporary mailbox environment associated with the mailbox data recovery request datastructure is spawned. A mailbox, corresponding to a mailbox account included in the selected subset of the available mailbox backup data, is created on the temporary mailbox environment. Mailbox data items, corresponding to mailbox data items associated with the mailbox account that are included in the selected subset of data, are restored to the created mailbox. An access notification indicating that the temporary mailbox environment is ready is generated.

18 Claims, 20 Drawing Sheets

(56) References Cited

U.S. PATENT DOCUMENTS

| | | | |
|---|---|---|---|
| 2012/0203821 A1* | 8/2012 | Czajka | G06Q 10/107 709/203 |
| 2013/0226870 A1 | 8/2013 | Dash | |
| 2016/0011790 A1 | 1/2016 | Rostoker | |
| 2017/0091047 A1 | 3/2017 | Bangalore | |
| 2017/0293628 A1 | 10/2017 | Adler | |
| 2018/0173596 A1 | 6/2018 | Petracca | |
| 2018/0239555 A1 | 8/2018 | Cao | |

* cited by examiner

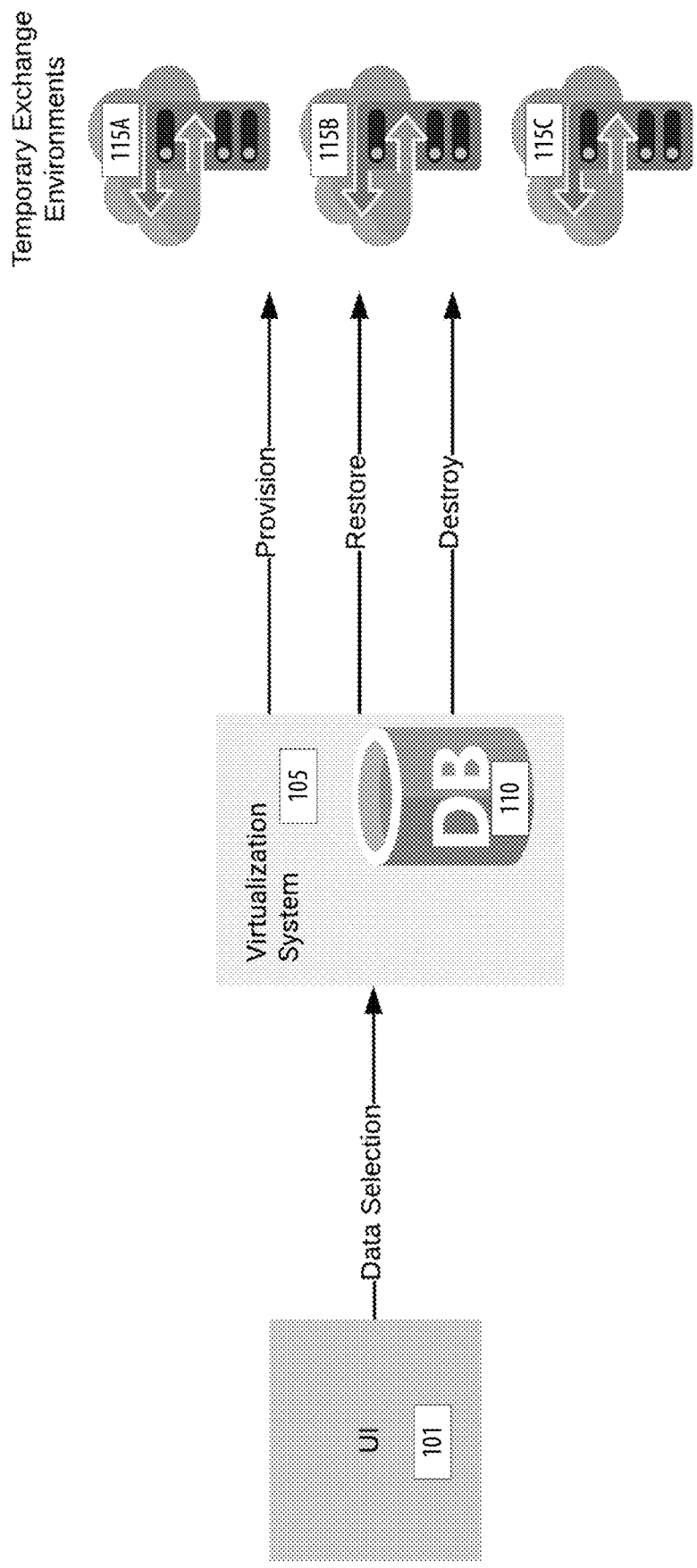

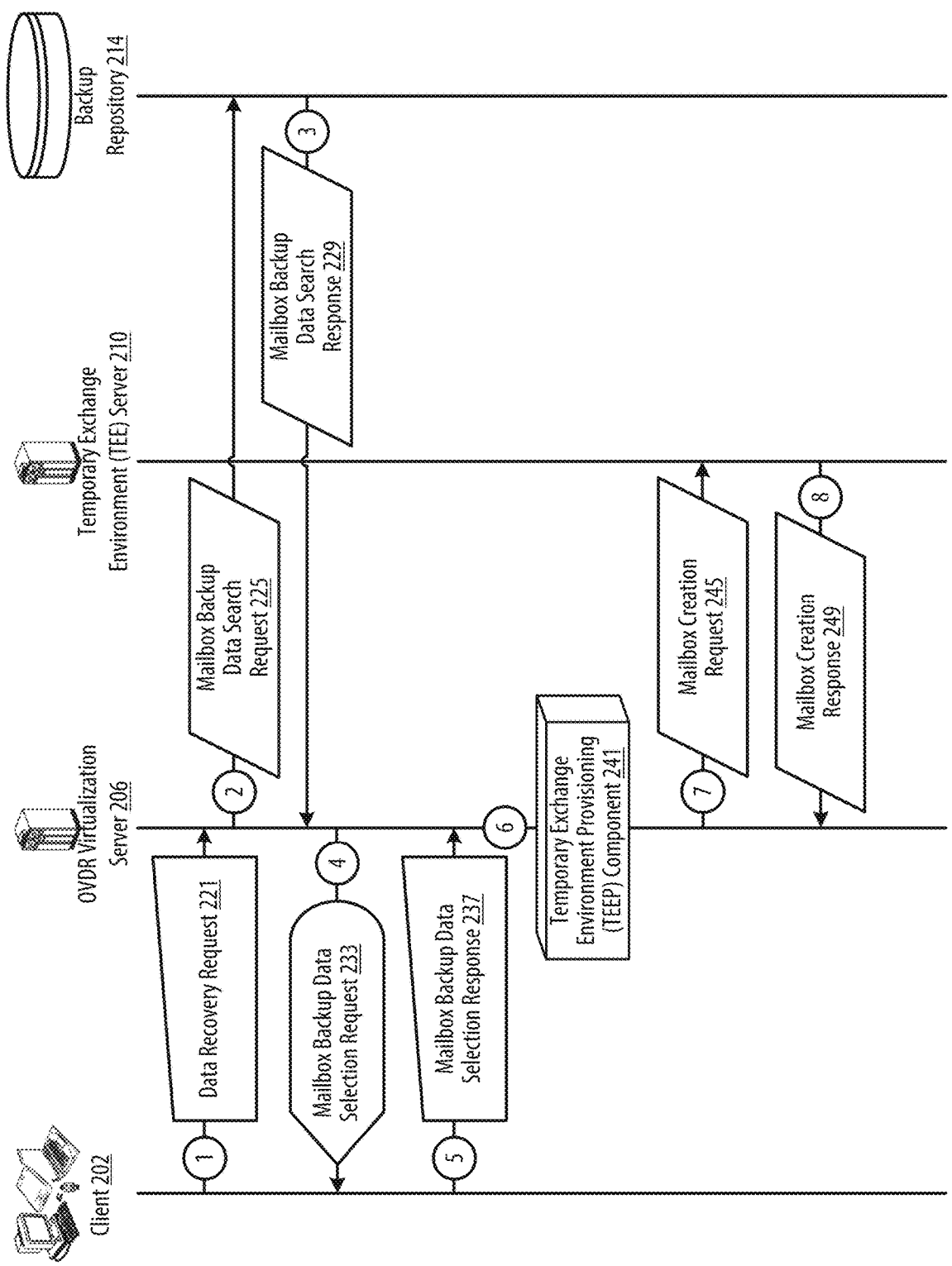
FIGURE 2A: OVDR DATA FLOW

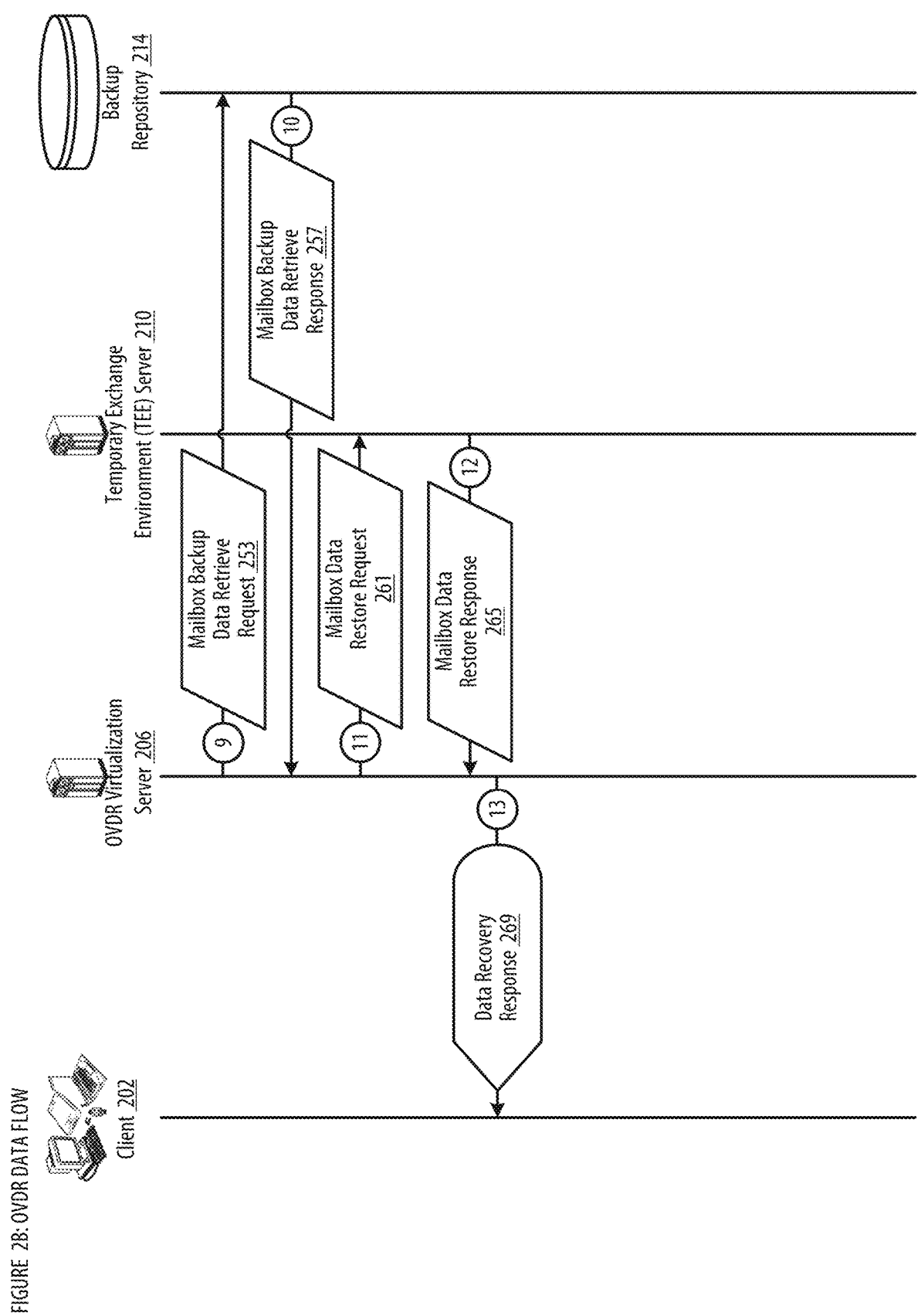

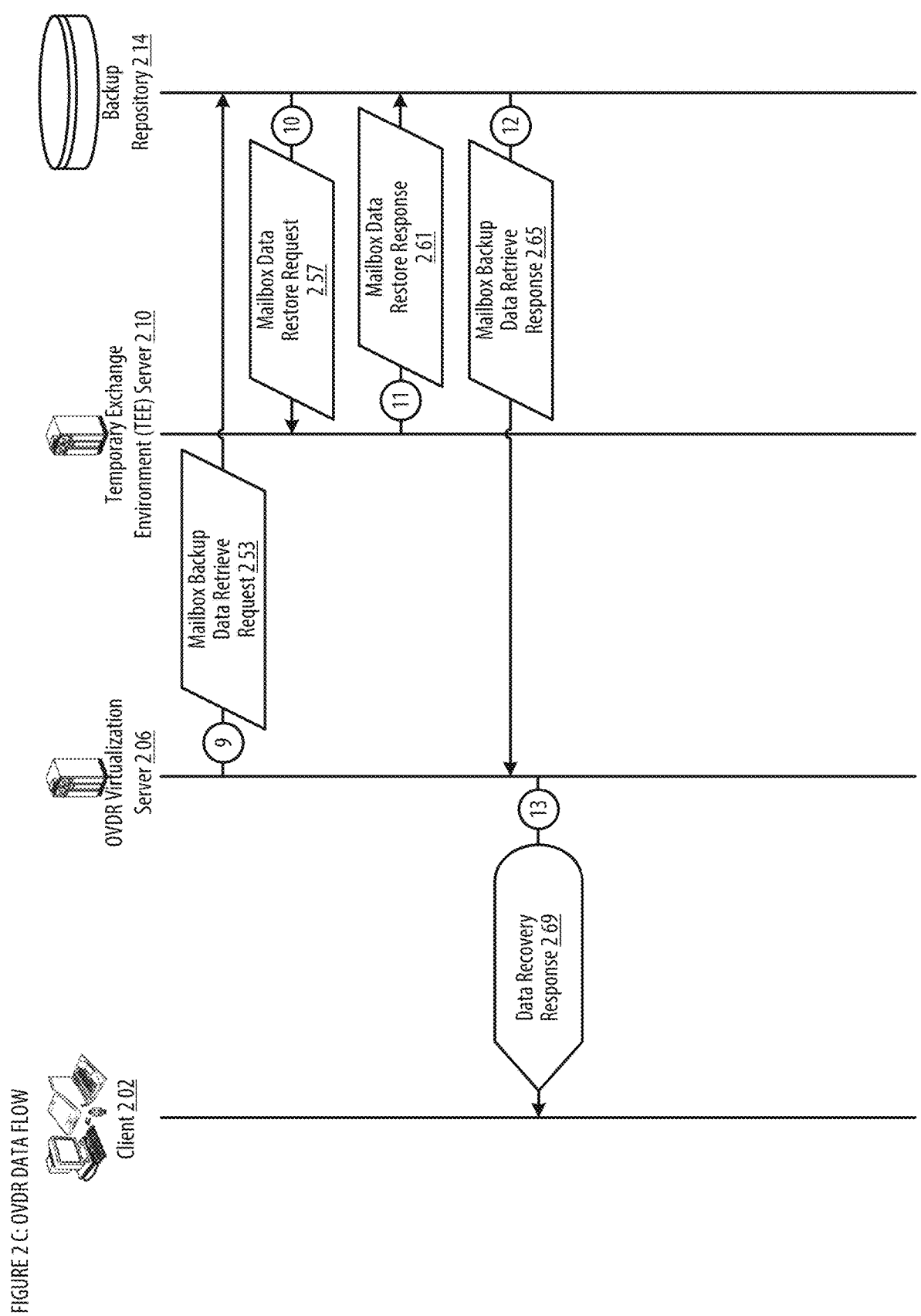
FIGURE 2 C: OVDR DATA FLOW

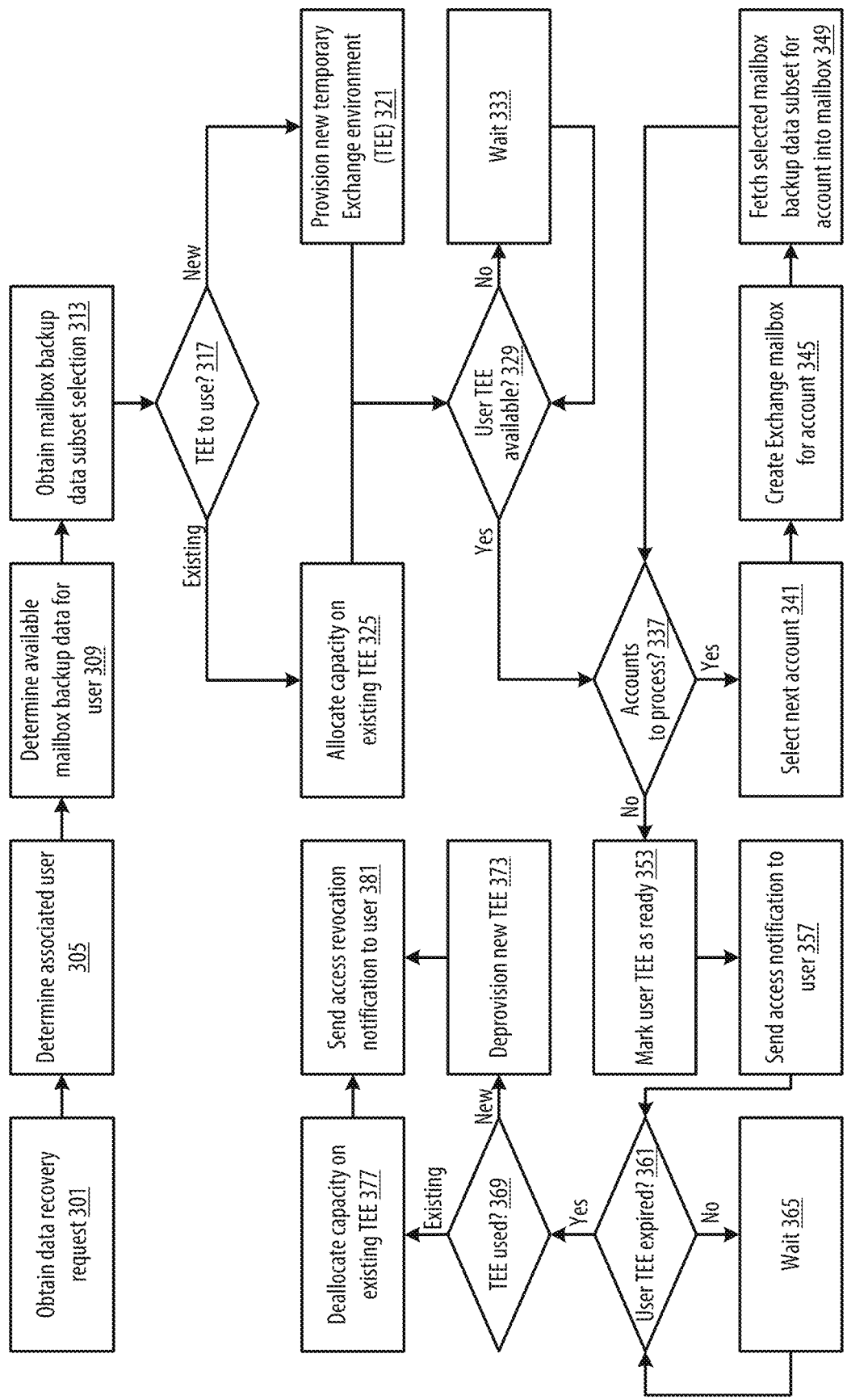

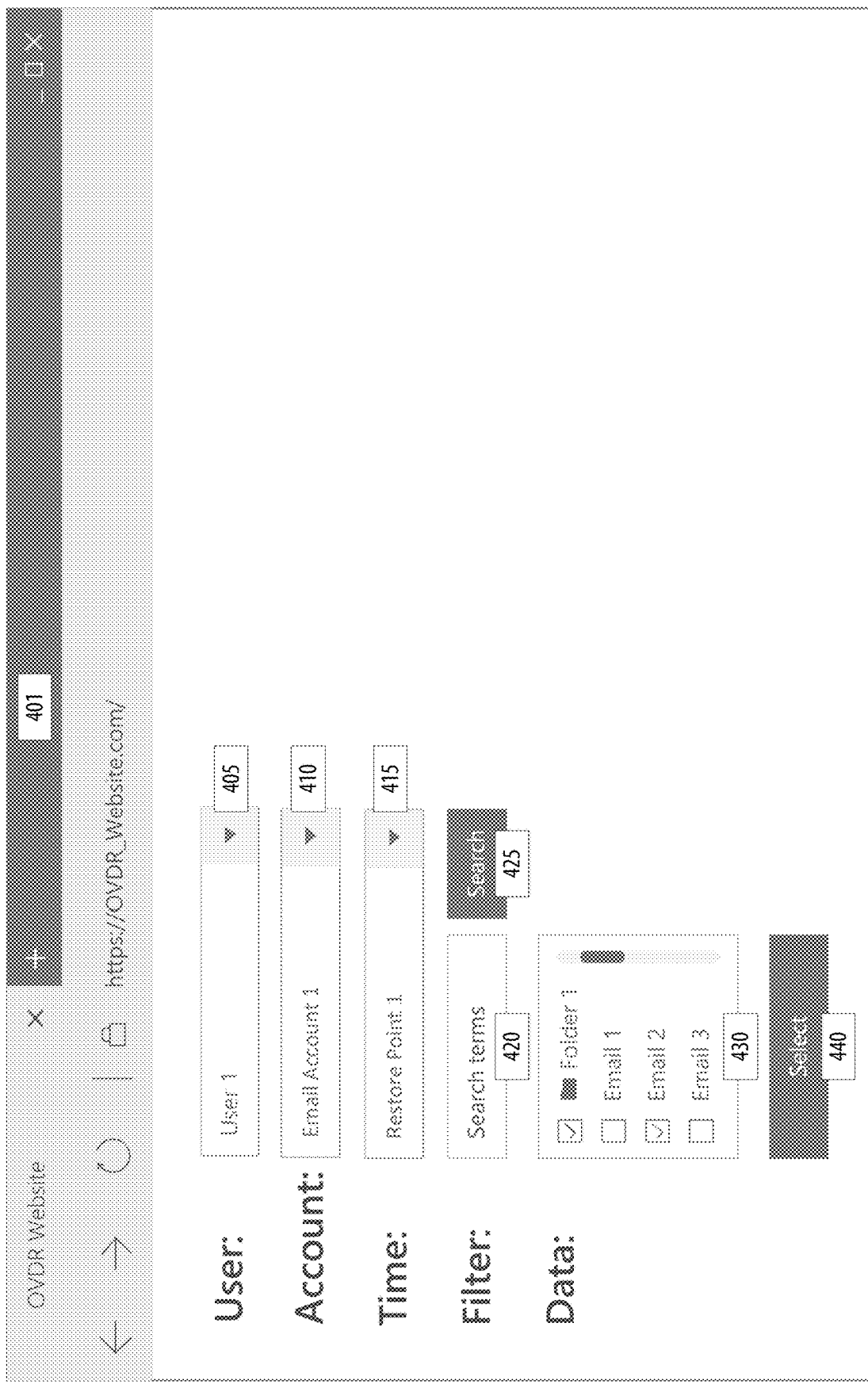
FIGURE 4: OVDR SCREENSHOT

FIGURE 5: OVDR SCREENSHOT

| Name | Email | Last Backup | Storage |
|---|---|---|---|
| Casto Cayman1 | admin@devman1.onmicrosoft.com | Never | 0 bytes |
| Basis Stairwell | basissstairwell@devman1.onmicrosoft.com | 12/20/2019 at 8:01 AM | 7.34 MB |
| Ben O | ben.o@devman1.onmicrosoft.com | 12/20/2019 at 6:05 AM | 610.24 MB |
| Conference Room | conference_room@devman1.onmicrosoft.com | Never | 0 bytes |
| Information Desk | infodesk@devman1.onmicrosoft.com | 12/20/2019 at 6:23 AM | 535.63 kB |
| Lazarus Cache | lazarus@devman1.onmicrosoft.com | 12/20/2019 at 6:23 AM | 34.54 MB |
| ManualUser | Manualuser@devman1.onmicrosoft.com | 12/20/2019 at 7:34 AM | 12.18 MB |
| New User | NewUser@devman1.onmicrosoft.com | 12/20/2019 at 6:07 AM | 249.85 kB |
| Test NoOneDrive | no-onedrive@devman1.onmicrosoft.com | 12/19/2019 at 10:09 PM | 221.51 kB |
| Reggie Reggression | reggie@devman1.onmicrosoft.com | 12/20/2019 at 2:52 PM | 19.21 MB |
| SorrelUser | SorrelUser@devman1.onmicrosoft.com | 12/20/2019 at 1:27 AM | 26.44 MB |
| spam | spam@devman1.onmicrosoft.com | 12/19/2019 at 10:09 PM | 1.2 MB |
| Solo Domain(Renamed) | subdomain@renamed.com | 12/20/2019 at 6:09 AM | 6.92 MB |
| Test Mailbox | testmailbox@devman1.onmicrosoft.com | 12/20/2019 at 6:13 AM | 914.13 kB |

Showing 1 to 14 of 14 entries

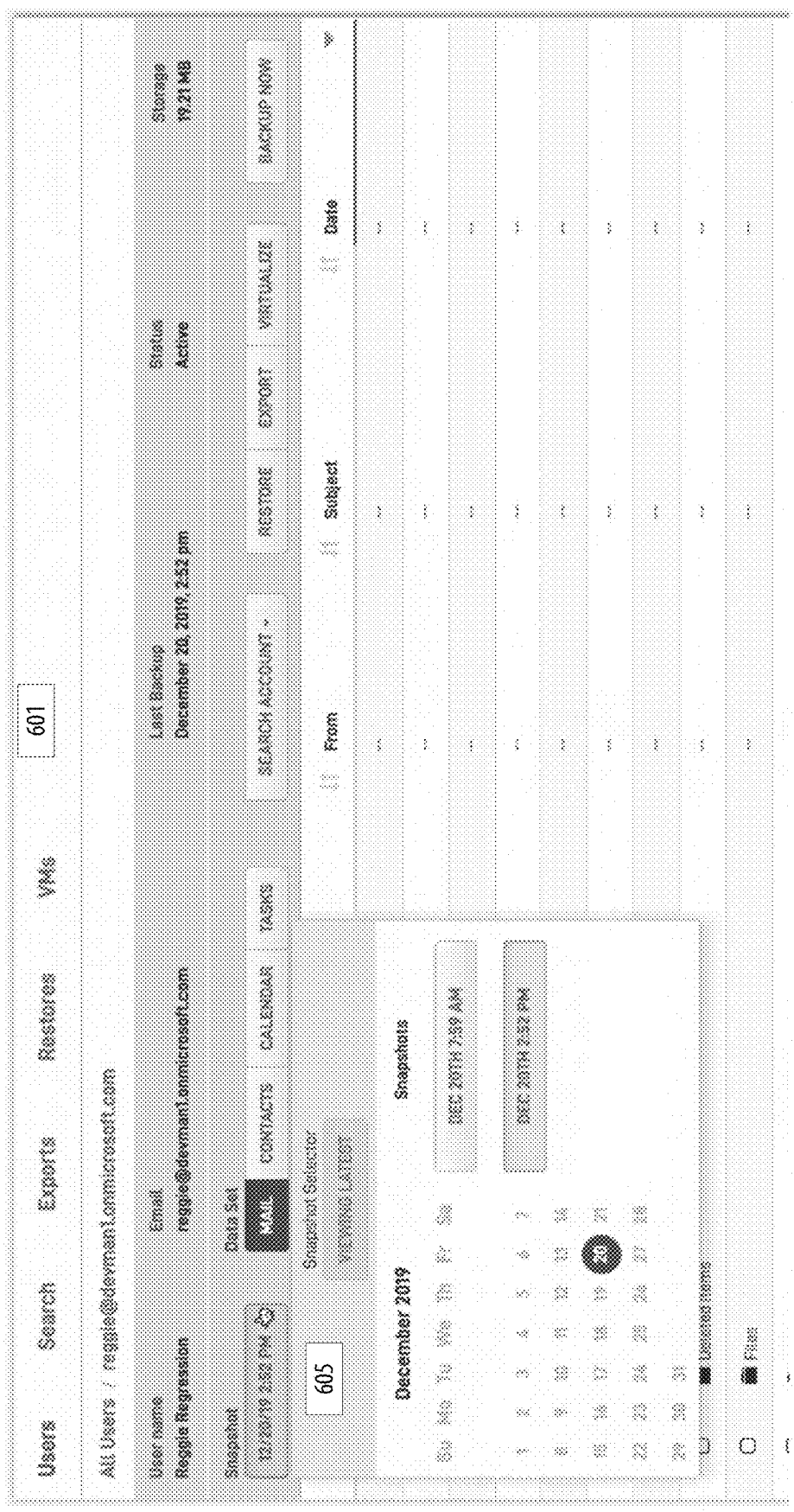
FIGURE 6: OVDR SCREENSHOT

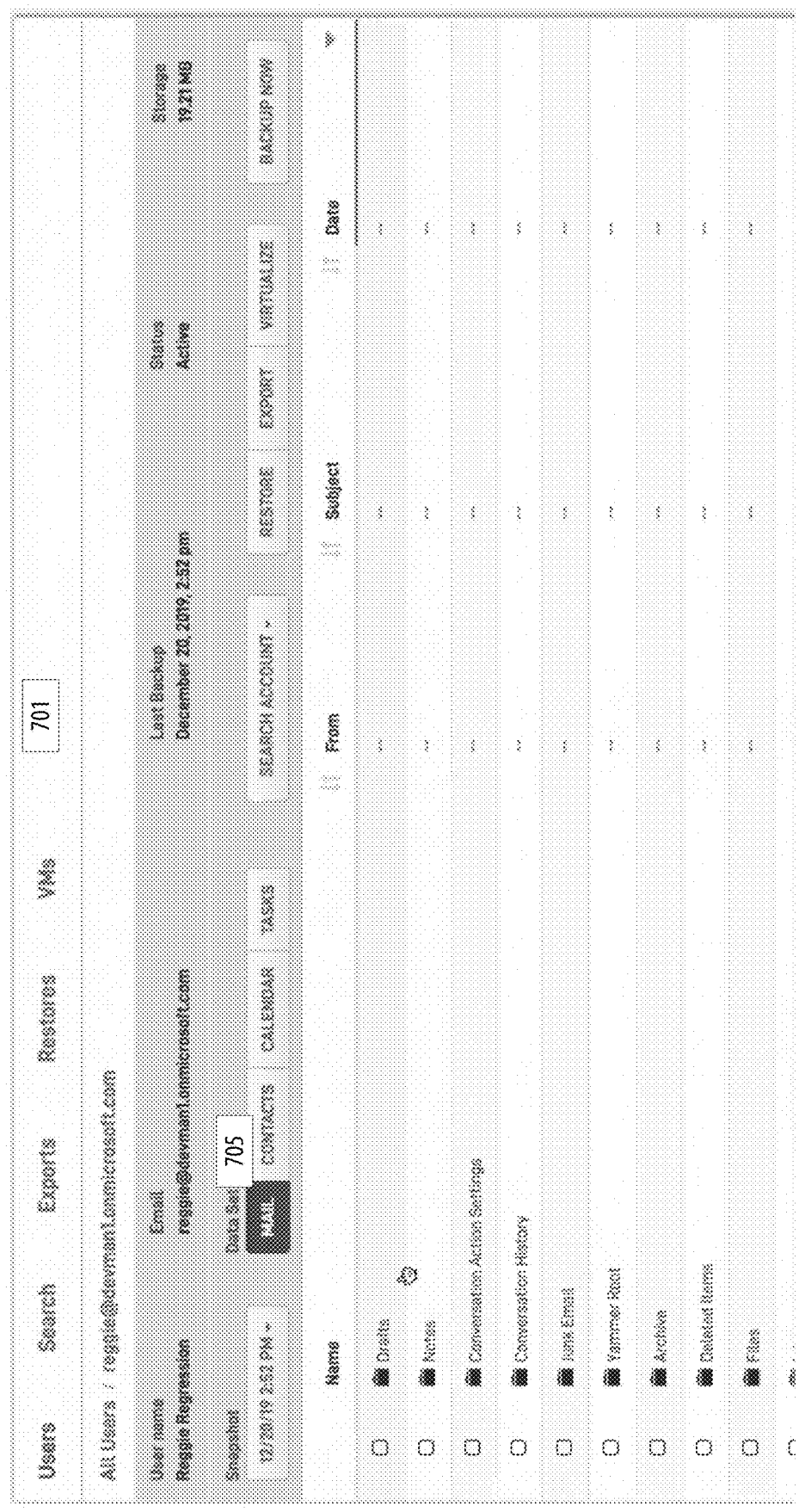
FIGURE 7: OVDR SCREENSHOT

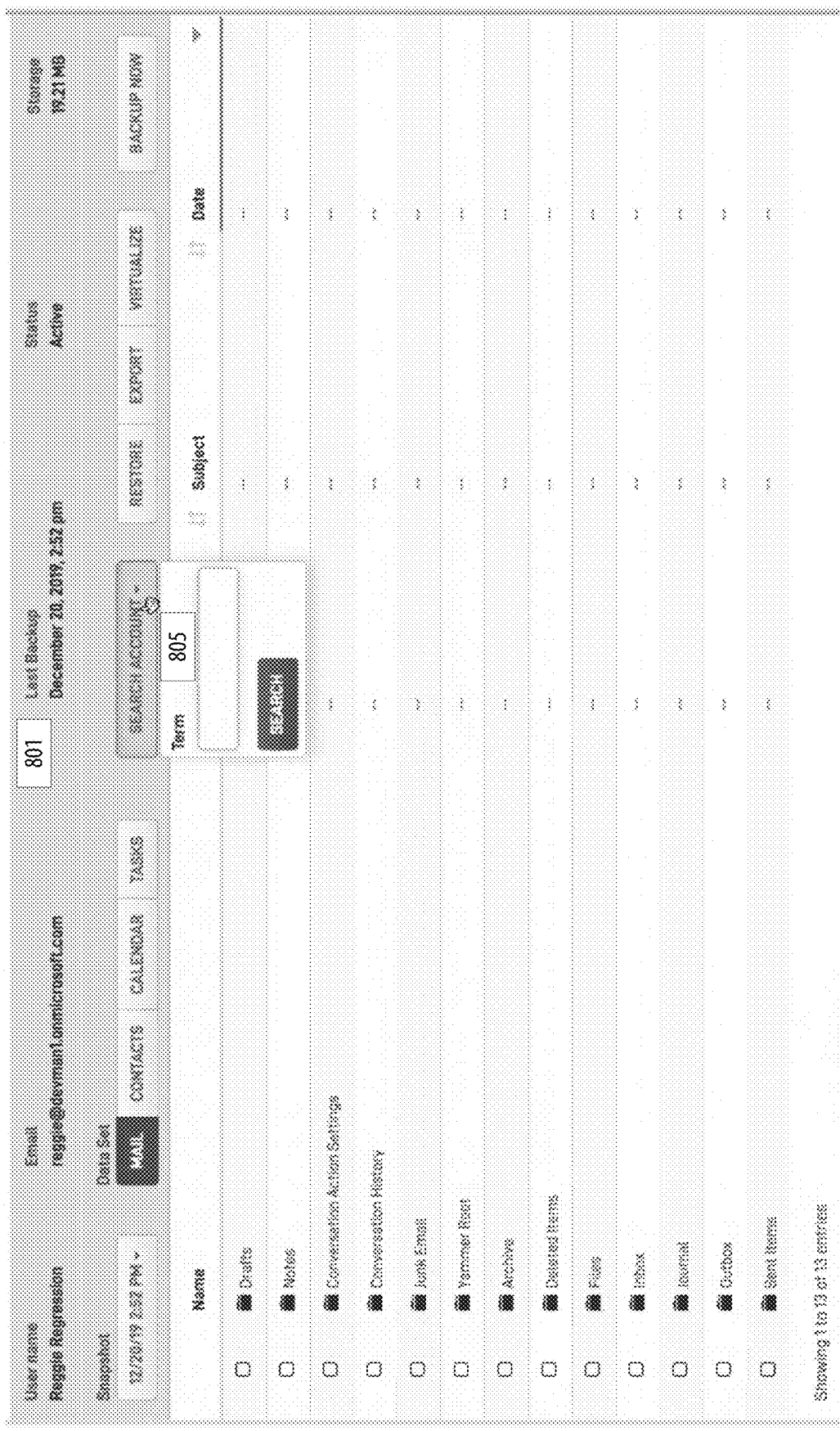
FIGURE 8: OVDR SCREENSHOT

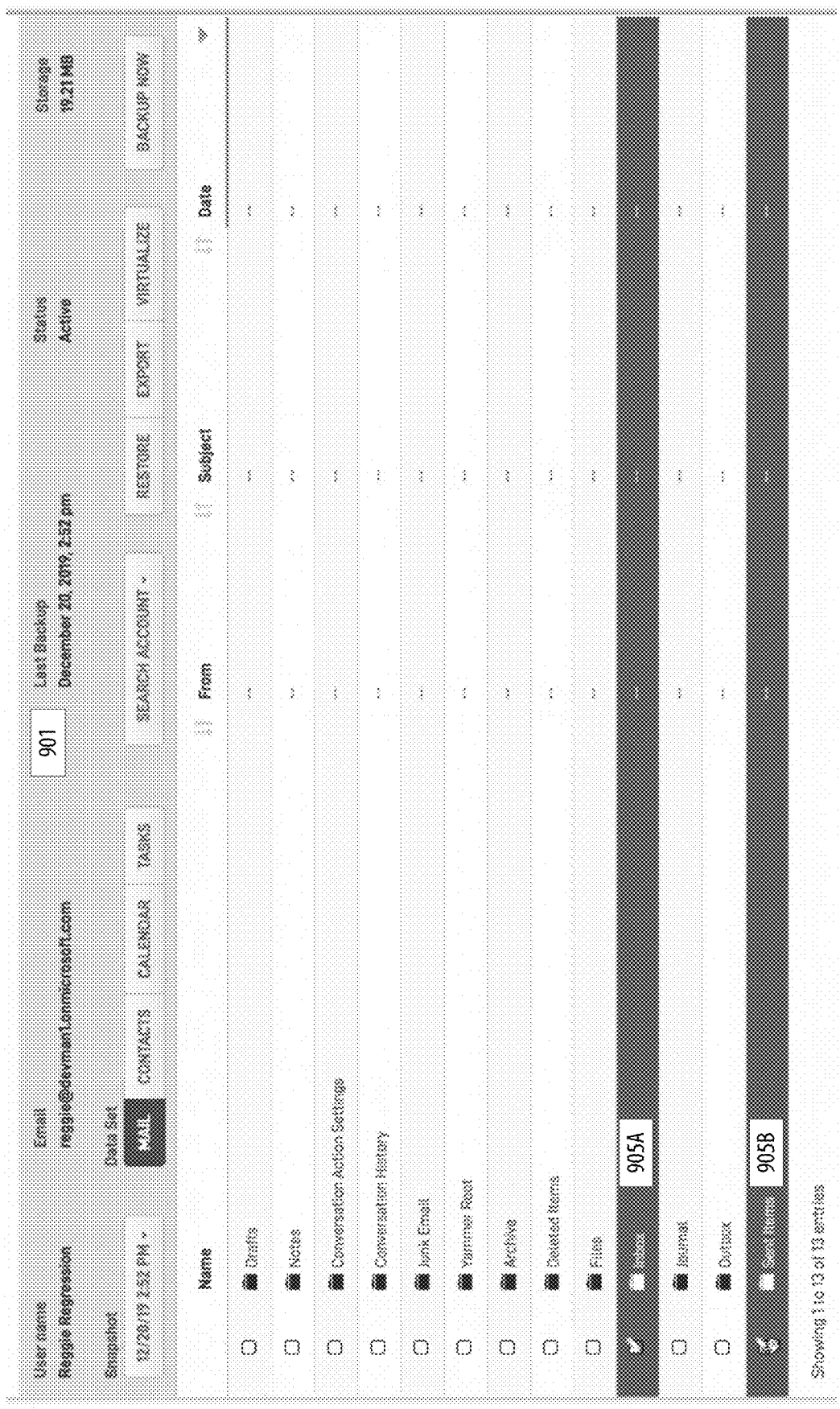
FIGURE 9: OVDR SCREENSHOT

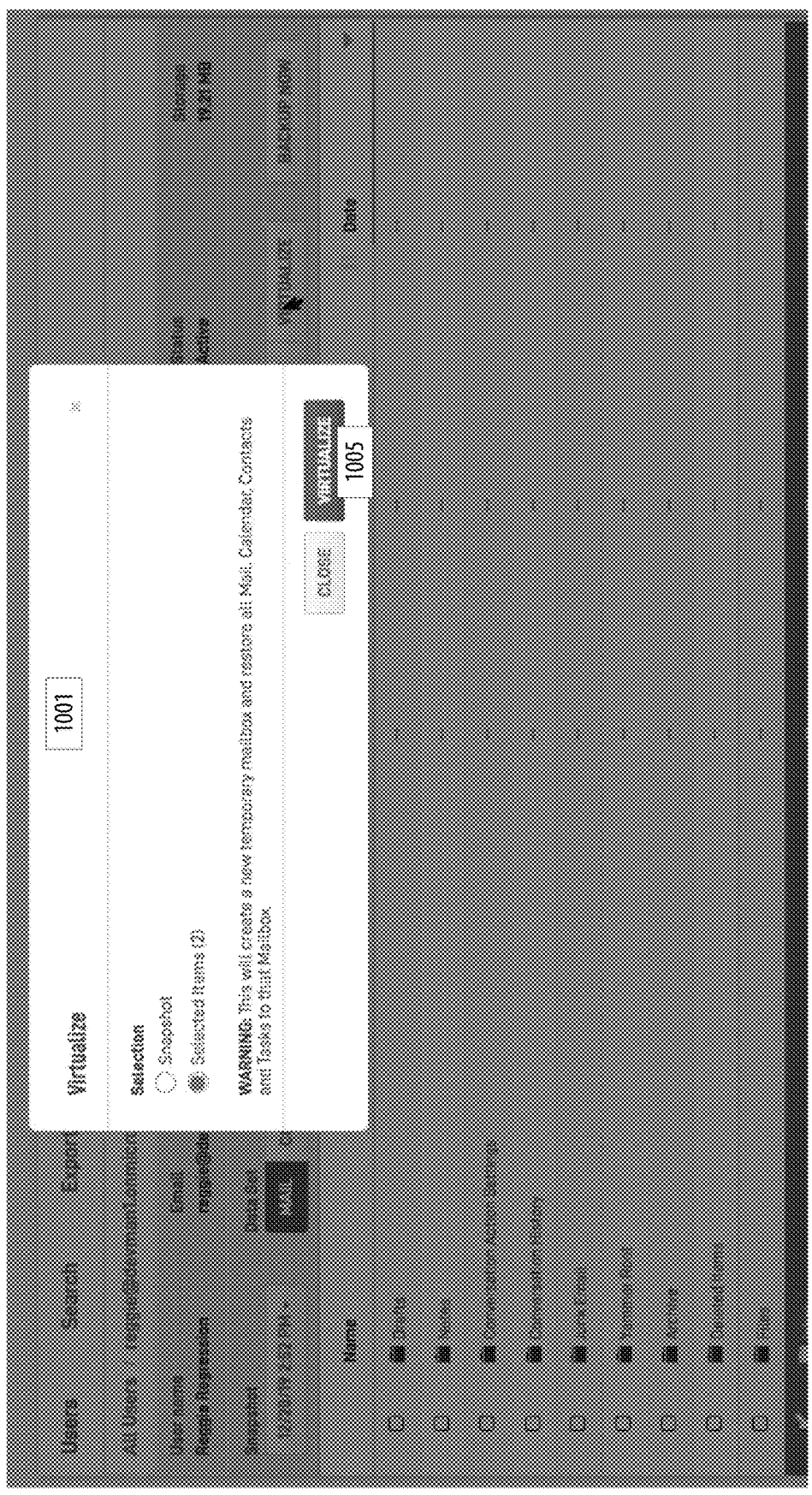
FIGURE 10: OVDR SCREENSHOT

FIGURE 11: OVDR SCREENSHOT

| Source | Destination | Type | Items | Size | Started | Time Taken | Status | Actions |
|---|---|---|---|---|---|---|---|---|
| Reggie Regression | ? | Snapshot selection | 74/76 | 17.86 MB | 12/20/2019 at 5:03 PM | 2s | in progress 1105 | : |
| Reggie Regression | 1576858938773_reggie@baverman1.onmicrosoft.com | Snapshot selection | 77/80 | 22.18 MB | 12/20/2019 at 4:22 PM | 63s | completed | ⟲ 🗑 |
| Reggie Regression | 1576854369672_reggie@baverman1.onmicrosoft.com | Snapshot selection | 77/80 | 18.53 MB | 12/20/2019 at 3:06 PM | 24s | completed | ⟲ 🗑 |
| Reggie Regression | 1576849897646_reggie@baverman1.onmicrosoft.com | Snapshot selection | 74/76 | 18.16 MB | 12/20/2019 at 2:04 PM | 22s | completed | ⟲ 🗑 |
| Reggie Regression | 1576849494897_reggie@baverman1.onmicrosoft.com | Snapshot selection | 73/76 | 17.84 MB | 12/20/2019 at 2:04 PM | 36s | completed | ⟲ 🗑 |
| spam | 1576798466642_spam@baverman1.onmicrosoft.com | Snapshot selection | 1/1 | 851.76 kB | 12/19/2019 at 10:44 PM | 2s | completed | ⟲ 🗑 |
| spam | 1576796464798a_spam@baverman1.onmicrosoft.com | Snapshot selection | 1/1 | 851.76 kB | 12/19/2019 at 10:20 PM | 22s | completed | ⟲ 🗑 |

Showing 1 to 7 of 7 entries (VMs C 1101)

FIGURE 12: OVDR SCREENSHOT

| Users | Search | Exports | Restores | VMs | | | | | | |
|---|---|---|---|---|---|---|---|---|---|---|
| Source | | Destination | | | Type | Items | Size | Started | Time Taken | State |
| Reggie Regression | | 1576864254592_reggie@dewman1.onmicrosoft.com | | | Snapshot selection | 78 / 80 | 22.44 MB | 12/20/2019 at 5:03 PM | 22s | completed |
| Reggie Regression | | 1576859938773_reggie@dewman1.onmicrosoft.com | | | Snapshot selection | 77 / 80 | 22.18 MB | 12/20/2019 at 4:22 PM | 43s | completed |
| Reggie Regression | | 1576864336572_reggie@dewman1.onmicrosoft.com | | | Snapshot selection | 77 / 80 | 18.53 MB | 12/20/2019 at 3:06 PM | 24s | completed |
| Reggie Regression | | 1576851897646_reggie@dewman1.onmicrosoft.com | | | Snapshot selection | 74 / 76 | 18.15 MB | 12/20/2019 at 2:24 PM | 22s | completed |
| Reggie Regression | | 1576850694897_reggie@dewman1.onmicrosoft.com | | | Snapshot selection | 73 / 76 | 17.84 MB | 12/20/2019 at 2:04 PM | 20s | completed |
| spam | | 1576795436542_spam@dewman1.onmicrosoft.com | | | Snapshot selection | 1/1 | 851.76 kB | 12/19/2019 at 10:44 PM | 2s | completed |
| spam | | 1576794867794_spam@dewman1.onmicrosoft.com | | | Snapshot selection | 1/1 | 851.76 kB | 12/19/2019 at 10:20 PM | 2s | completed |

Showing 1 to 7 of 7 entries

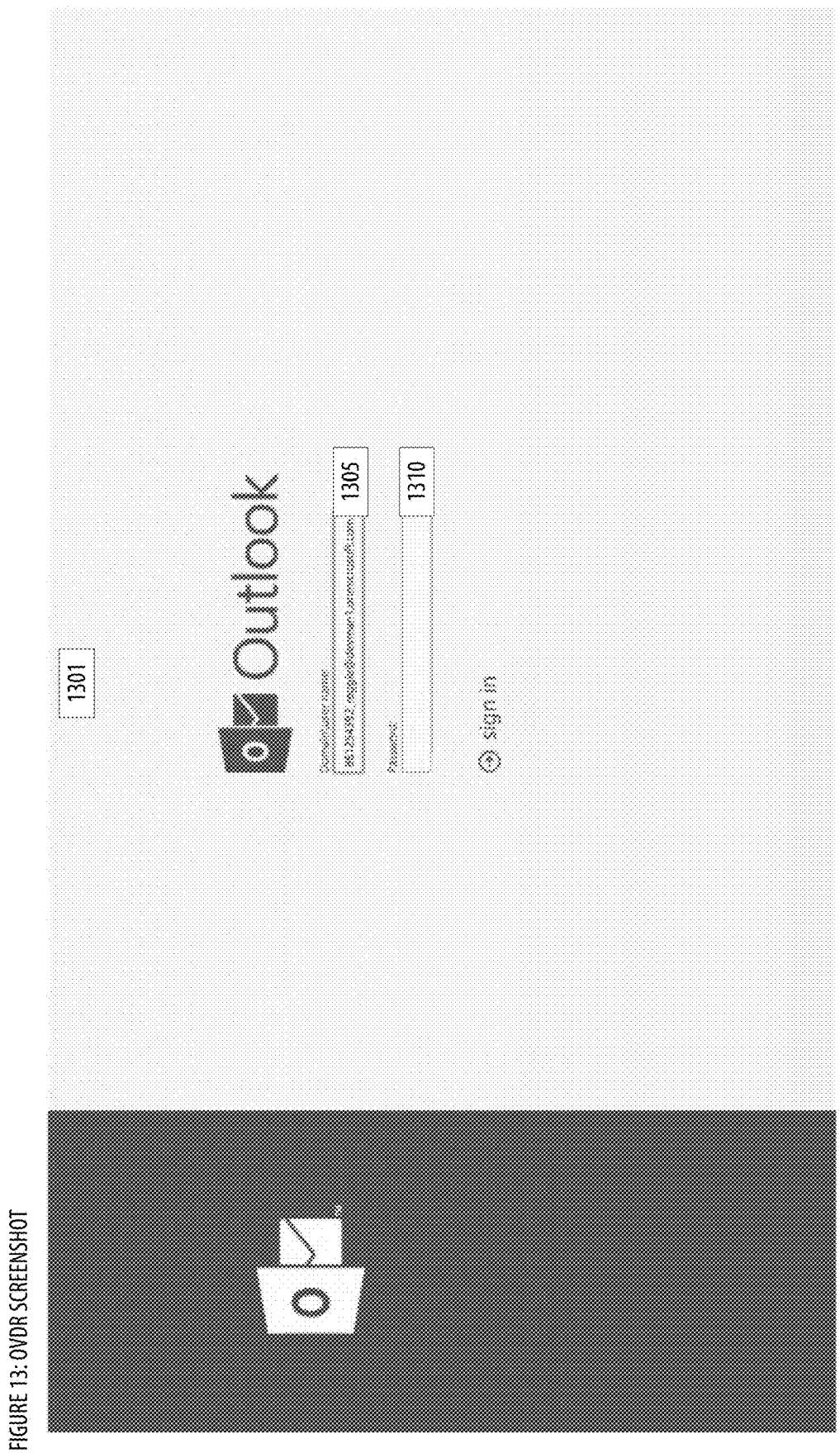
FIGURE 13: OVDR SCREENSHOT

FIGURE 14: OVDR SCREENSHOT

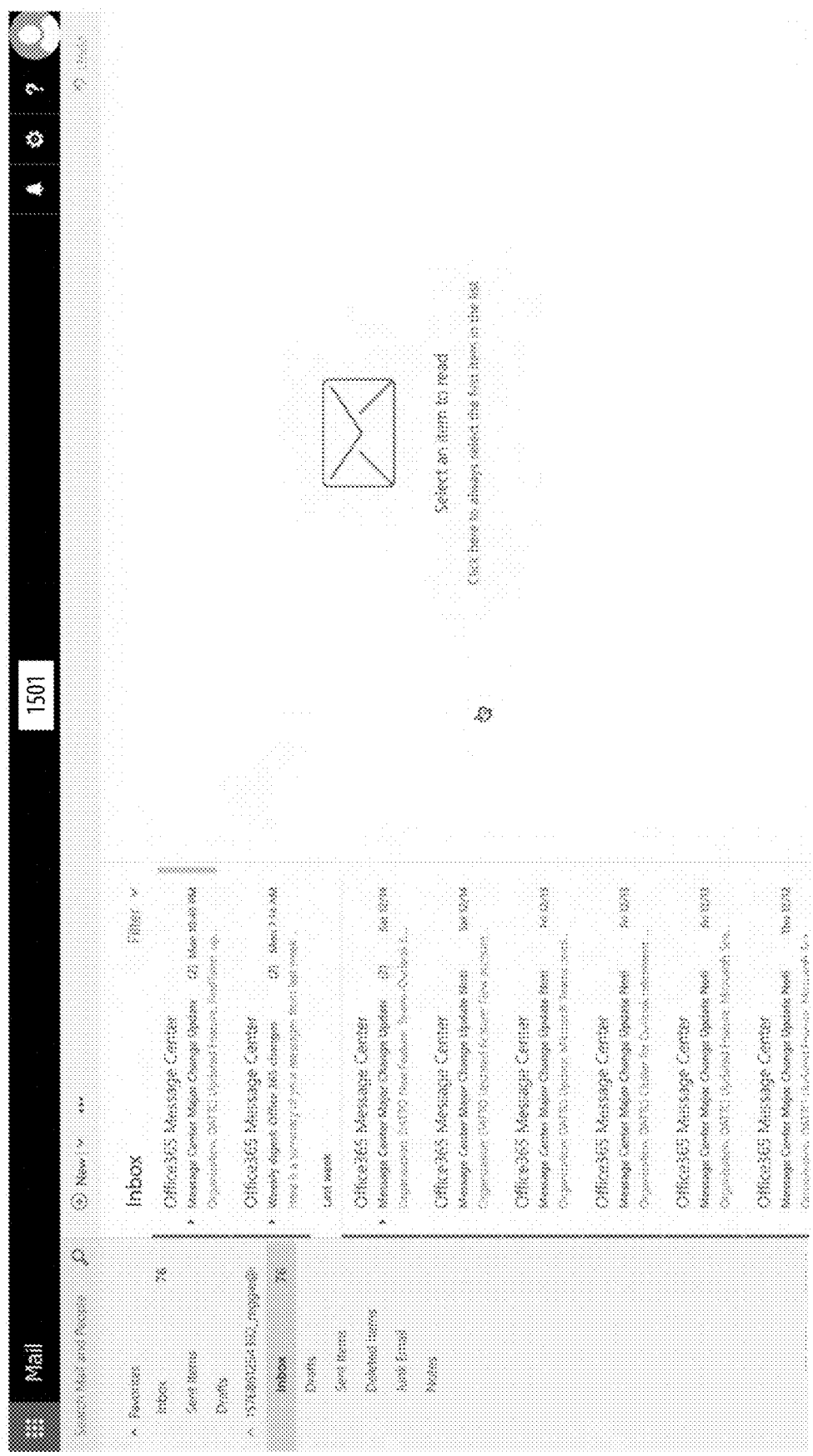
FIGURE 15: OVDR SCREENSHOT

FIGURE 16: OVDR SCREENSHOT

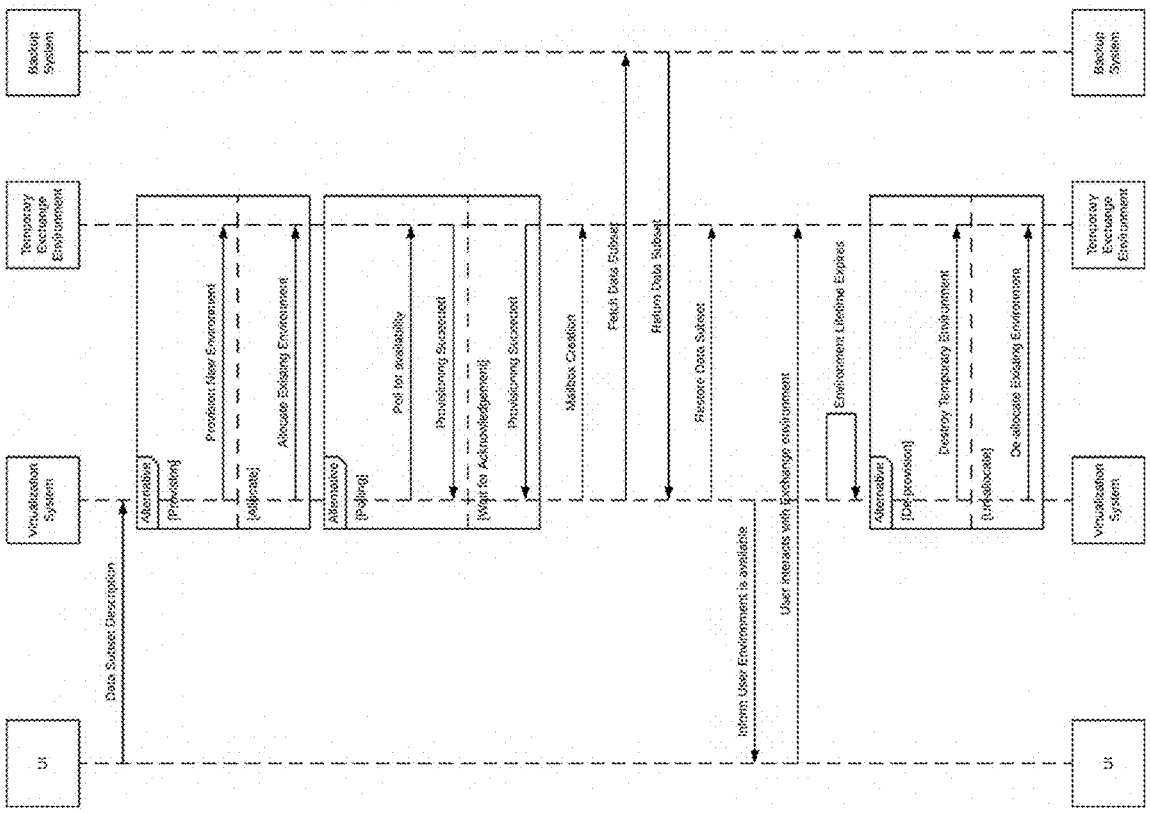
FIGURE 17: OVDR IMPLEMENTATION CASE

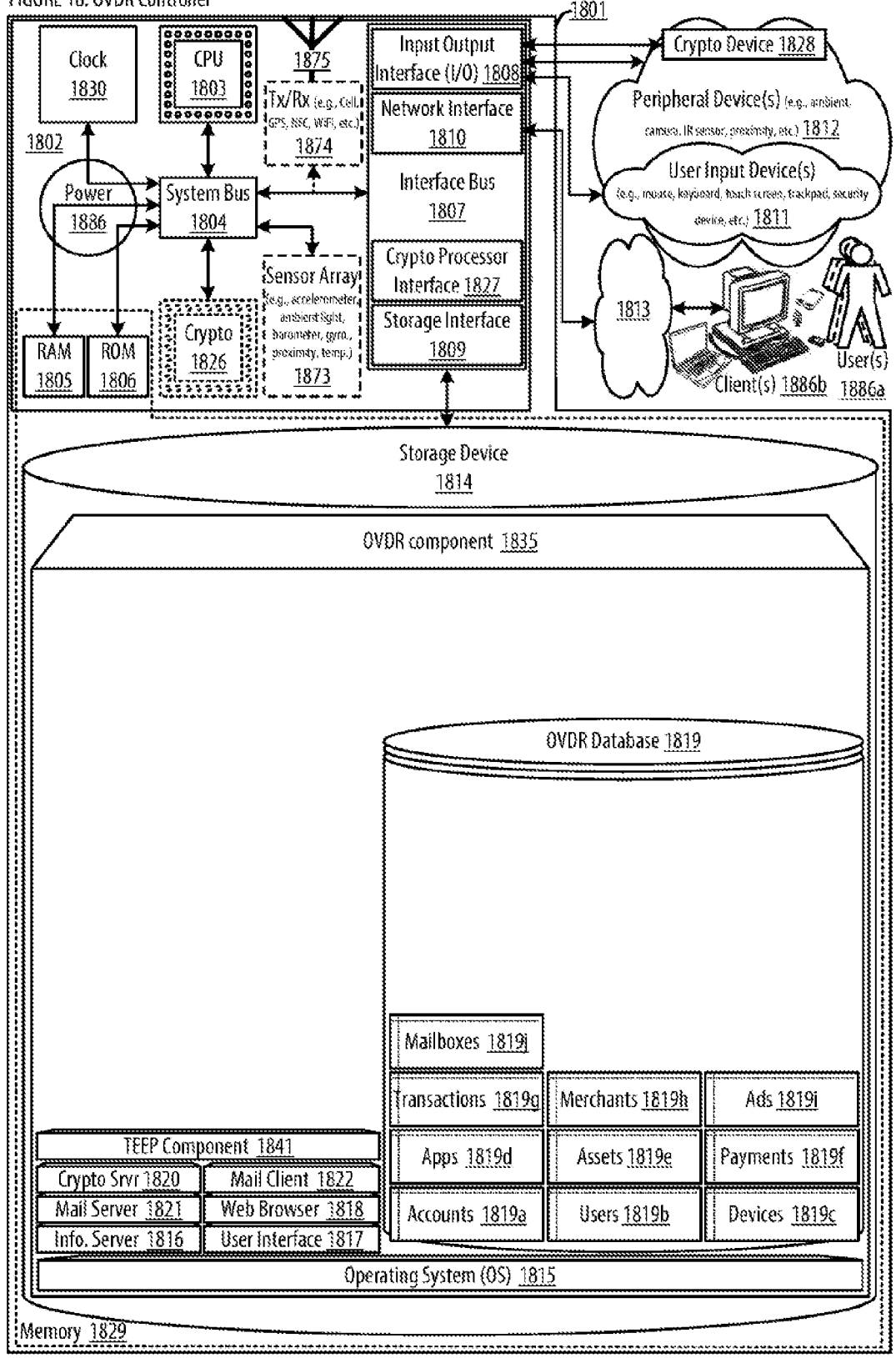

ON-DEMAND VIRTUALIZED DATA RECOVERY APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address backup systems, and more particularly, include On-demand Virtualized Data Recovery Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Computer system backups are utilized to protect data from being lost due to equipment failures, malware and accidental deletions. A backup may involve copying files to be backed up from one location to another location. For example, files may be copied from a solid-state drive in a user's desktop to an external hard drive that may be connected to the user's desktop via USB. Microsoft Exchange is an email and calendaring system offered as a hosted or on-premises solution.

BRIEF DESCRIPTION OF THE DRAWINGS

Appendices and/or drawings illustrating various, non-limiting, example, innovative aspects of the On-demand Virtualized Data Recovery Apparatuses, Methods and Systems (hereinafter "OVDR") disclosure, include:

FIG. 1 shows an architecture for the OVDR;

FIGS. 2A-C show a datagraph illustrating data flow(s) for the OVDR;

FIG. 3 shows a logic flow illustrating embodiments of a temporary Exchange environment provisioning (TEEP) component for the OVDR;

FIG. 4 shows a screenshot illustrating user interface(s) of the OVDR;

FIG. 5 shows a screenshot illustrating user interface(s) of the OVDR;

FIG. 6 shows a screenshot illustrating user interface(s) of the OVDR;

FIG. 7 shows a screenshot illustrating user interface(s) of the OVDR;

FIG. 8 shows a screenshot illustrating user interface(s) of the OVDR;

FIG. 9 shows a screenshot illustrating user interface(s) of the OVDR;

FIG. 10 shows a screenshot illustrating user interface(s) of the OVDR;

FIG. 11 shows a screenshot illustrating user interface(s) of the OVDR;

FIG. 12 shows a screenshot illustrating user interface(s) of the OVDR;

FIG. 13 shows a screenshot illustrating user interface(s) of the OVDR;

FIG. 14 shows a screenshot illustrating user interface(s) of the OVDR;

FIG. 15 shows a screenshot illustrating user interface(s) of the OVDR;

FIG. 16 shows a screenshot illustrating user interface(s) of the OVDR;

FIG. 17 shows implementation case(s) for the OVDR;

FIG. 18 shows a block diagram illustrating embodiments of a OVDR controller.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The On-demand Virtualized Data Recovery Apparatuses, Methods and Systems (hereinafter "OVDR") transforms data recovery request, mailbox backup data selection response inputs, via OVDR components (e.g., TEEP, etc. components), into mailbox backup data selection request, data recovery response outputs. The OVDR components, in various embodiments, implement advantageous features as set forth below.

Introduction

The OVDR provides unconventional features (e.g., access to an isolated snapshot of backed up mailbox data using a virtualized temporary Exchange environment server) that were never before available in backup systems. Unlike typical Exchange environments that are set up manually and persist for long periods of time, the OVDR automatically provisions an Exchange server, automatically populating it with a pre-selected subset of backup data, and then automatically informing the user when the environment is ready. Standard Exchange servers may provide high availability and the ability to recover deleted data, however, they a) do not provide an isolated new server containing a snapshot of historical data; b) are meant for hosted Exchange, not Office365; and c) do not provide business continuity in the face of the complete unavailability or loss of the original environment.

Currently, SaaS protection products provide access to backed-up Office365 Exchange data in two ways: export (user downloads a copy) and restore (the data is put back into the user's existing Office365 Exchange). The restore option has two shortcomings: 1) it is additive, on top of the existing current data; 2) it is not available when Office365 Exchange is not available. Meanwhile, exports have the disadvantage that they are a downloaded format and do not automatically permit functionality like the ability to browse or search email content.

The OVDR's hosted Exchange environments address these shortcomings, by providing a copy of backed-up data that is accessible when Office365 is not available, that provides an isolated snapshot of the backed-up data, and that provides full email business continuity, i.e., providing the ability to search and interact with emails in a way similar to that provided by Office365.

1. Data Subset Selection

In this step, the user uses a (e.g., a web-based) UI to select: a point in time (e.g., from existing backups) to virtualize from; a data subset (e.g., user list, search, etc.) that determines which items should be virtualized; and a lifetime for the virtualized environment. Below are three exemplary ways to make the data subset selection:

a) Entire Account: The user is presented with a web interface that lists accounts for the customer with Exchange backups. This list may be sorted or filtered to find the relevant account. After selecting an account, the user is presented with a view showing Exchange data for that user as well as options for data restore and virtualization. Additionally, this UI allows the user to select a point in time from the list of point-in-times available for the selected user, defaulting to the most recent. In this case, the data subset is data that exists for the account at the selected point in time. If the Exchange virtualization option is selected, data for the user may be virtualized into the temporary Exchange environment.

b) Search: The user is presented with a web interface that allows them to select a point in time; provide a search term; and optionally select one or multiple accounts (in the usage of 1a above) to search within. The default is to search within all accounts. When the search is executed, it will show in the UI elements matching the search. In this case, the data subset is data matching the provided search. If Exchange virtualization option is selected, data matching the search may be virtualized into the temporary Exchange environment.

c) Selected: In 1a and 1b above, the UI presents a list of items present in the given context at the selected point in time. Within this context, the user may browse this data, including clicking through a paginated list and/or clicking on folders to view the items inside that folder, to identify items they wish to virtualize. Desired items are selected in the UI. In this case, the data subset is selected items, as well as any items that live inside of any selected folders. When the Exchange virtualization option is selected, those items selected by the user are virtualized into the temporary Exchange environment.

2. Provisioning

After the virtualize into Exchange option is selected in the UI, UI may query the Virtualization System (VS), which may create a temporary Exchange environment (TEE) and restore the selected data subset into the TEE, as follows:

a) The UI may send a request to the VS containing a description of the data subset selected in step 1. This description may include: unique identifiers for the accounts selected; search terms used, if any; a list of the unique identifiers of selected items; and the selected point in time.

b) A description of the data subset from step 1 is stored within the VS.

c) A new TEE is dynamically created and assigned a hostname. Information about the TEE is stored, including its lifetime (e.g., as selected by the user in step 1) and its connection information, which may include: the hostname and port used to communicate with the TEE by Exchange Web Services (EWS) API; the web URL used to access the Outlook Web App of the TEE; the URL used to connect an Exchange client to the TEE; and the username and password used to connect to the TEE.

d) The VS waits for the TEE to be provisioned. This may be done either: by querying a TEE API that will return whether it is completely available; by attempting step 2e and retrying if it fails; or by waiting a period of time predetermined to be sufficient for the TEE to be available.

e) For each account described in the data subset, an Exchange mailbox is created. This could be done via the EWS API, via PowerShell, or by another method. The connection information for the mailbox is added to the aggregate connection information of the TEE.

f) The VS uses the description of the data subset to begin fetching from the data subset from stored backups. For each item in the data subset, the associated data is retrieved from backups and then restored via the EWS API into the TEE.

g) When the restore into the TEE is completed, the VS marks the virtualization as ready.

3. Notification and Access

Upon creation of the TEE environment, a notification is sent to the user that the TEE is available. This notification may be an email, within the application UI, or by another method. The notification may provide hyperlinks to a management screen and may also contain connection information (in the sense of Provisioning section 2c) about the TEE and each mailbox in the TEE, allowing the user to connect to mailboxes in the TEE via Outlook Web App or via Outlook client. The user may interact (e.g., search and view folders, emails, calendar entries, contacts, tasks, notes, etc.) with their Exchange environment as though it were a regular, permanent Exchange environment (e.g., in some implementation sending and/or receiving email via the temporary Exchange environment may be disabled).

4. Management

The UI may include a management screen to provide to the user a way to see currently active TEEs, as well as a way to access the connection information for each TEE. To do this, the UI requests from the VS TEEs that are active for the user. The VS may return a list of TEEs. This list may contain: the description of the data subset (in the sense of Provisioning section 2a); the TEE connection information (in the sense of Provisioning section 2c); and the TEE lifetime.

The UI then displays the list of TEE information to the user. This may include features such as the ability to sort, filter, and search the TEEs. It may also include a hyperlink to the Outlook Web App of the TEE.

Each TEE may have an option to request an extension of the lifetime of that TEE. If this option is selected, the user may enter an extended lifetime for the TEE, and the VS may be queried to update the lifetime.

5. Expiry

When the lifetime of a TEE has expired (e.g., after a predetermined period of time—this predetermined expiry time may be a default duration after the environment is created, or it may be selected from a pre-set list of durations during the provisioning in step 1), the VS may destroy the TEE by reclaiming the virtualized resources used by the TEE. The Management UI may therefore be updated to not include the TEE. The user may be sent a notification indicating that the TEE is no longer available.

OVDR

FIG. 1 shows an architecture for the OVDR. In FIG. 1, an embodiment of how the OVDR may be implemented to facilitate access to snapshots of backed up mailbox data using virtualized temporary Exchange environments is illustrated. The user interface (UI) 101 may provide a data selection (e.g., user list, search, etc.) to a virtualization system 105. The virtualization system stores the data selection, and provisions and/or allocates capacity on a temporary Exchange environment 115A-C for the data selection. The virtualization system restores the mailbox data indicated by the data selection from a backup database 110 to the provisioned and/or allocated temporary Exchange environment. Upon expiry, the virtualization system de-allocates and/or de-provisions the temporary Exchange environment.

FIGS. 2A-C show a datagraph illustrating data flow(s) for the OVDR. In FIG. 2A, a client 202 (e.g., of a user) may send a data recovery request 221 to an OVDR virtualization server 206 to. For example, the client may be a desktop, a laptop, a tablet, a smartphone, a smartwatch, and/or the like that is executing a client application. In one implementation, the data recovery request may include data such as a request identifier, a request type, a user identifier, and/or the like. In one embodiment, the client may provide the following example data recovery request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>JohnDaDoeDoeDoooe@gmail.com</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>OVDR.app</app_name>
        <app_version>1.0 </app_version>
        <app_webkit_name>Mobile Safari</app_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
```

```
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client version>537.75.14</client version>
    </client_details>
    <data_recovery_request>
        <request_identifier>ID_request_1</request_identifier>
        <request_type>DATA_SEARCH</request_type>
        <user_identifier>ID_user_1</user_identifier>
    </data_recovery_request>
</auth_request>
```

The OVDR virtualization server 206 may send a mailbox backup data search request 225 to a backup repository 214 to determine available mailbox backup data for the specified user. In one implementation, the mailbox backup data search request may include data such as a request identifier, a request type, a user identifier, and/or the like. In one embodiment, the OVDR virtualization server may provide the following example mailbox backup data search request, substantially in the form of a HTTP(S) POST message including XML-formatted data, as provided below:

```
POST /mailbox_backup_data_search_request.php HTTP/1.1
Host: www.server.com
Content-Type: Application/XML
Content-Length: 667
<?XML version = "1.0" encoding = "UTF-8"?>
<mailbox_backup_data_search_request>
```

```
    <request_identifier>ID_request_2</request_identifier>
    <request_type>DATA_SEARCH</request_type>
    <user_identifier>ID_user_1</user_identifier>
</mailbox_backup_data_search_request>
```

The backup repository 214 may send a mailbox backup data search response 229 to the OVDR virtualization server 206 with the requested list of available mailbox backup data for the specified user. In one implementation, the mailbox backup data search response may include data such as a response identifier, a list of available mailbox backup data, and/or the like. In one embodiment, the backup repository may provide the following example mailbox backup data search response, substantially in the form of a HTTP(S) POST message including XML-formatted data, as provided below:

```
POST /mailbox_backup_data_search_response.php HTTP/1.1
Host: www.server.com
Content-Type: Application/XML
Content-Length: 667
<?XML version = "1.0" encoding = "UTF-8"?>
<mailbox_backup_data_search_response>
    <response_identifier>ID_response_2</response_identifier>
    <mailbox_backup_data_list>
        <account>
            <account_identifier>account_1@email_provider.com</account_identifier>
            <first_name>John</first_name>
            <last_name>Smith</last_name>
            <snapshot>
                <snapshot_identifier>12/20/2019_2:52PM</snapshot_identifier>
                <dataset>
                    <email>
                        <folder>Inbox</folder>
                        <folder>Drafts</folder>
                        <folder>Sent</folder>
                        ...
                    </email>
                    <contacts>
                        <contact>Alice</contact>
                        <contact>Bob</contact>
                        ...
                    </contacts>
                    <calendar>
                        <appointment>Appointment1</appointment>
                        <meeting>Meeting1</meeting>
```

```
            ...
        </calendar>
        <tasks>
            <task>Task1</task>
            <task>Task2</task>
            ...
        </tasks>
    </dataset>
</snapshot>
<snapshot>
    <snapshot_identifier>12/20/2019_7:59AM</snapshot_identifier>
    <dataset>
        <email>
            <folder>Inbox</folder>
            <folder>Drafts</folder>
            <folder>Sent</folder>
            ...
        </email>
        <contacts>
            <contact>Alice</contact>
            <contact>Bob</contact>
            ...
        </contacts>
        <calendar>
            <appointment>Appointment1</appointment>
            ...
        </calendar>
        <tasks>
            <task>Task1</task>
            ...
        </tasks>
    </dataset>
</snapshot>
...
</account>
<account>
    <account_identifier>account_2@email_provider2.com</account_identifier>
    <first_name>John</first_name>
    <last_name>Smith</last_name>
    <snapshot>
        <snapshot_identifier>12/22/2019_1:32PM</snapshot_identifier>
        <dataset>
            ...
        </dataset>
    </snapshot>
    ...
</account>
    </mailbox_backup_data_list>
</mailbox_backup_data_search_response>
```

The OVDR virtualization server 206 may send a mailbox backup data selection request 233 to the client 202 to prompt the user to select mailbox backup data to recover. In one implementation, the mailbox backup data selection request may include data such as a request identifier, a list of available mailbox backup data, and/or the like. In one embodiment, the OVDR virtualization server may provide the following example mailbox backup data selection request, substantially in the form of a HTTP(S) POST message including XML-formatted data, as provided below:

```
POST /mailbox_backup_data_selection_request.php HTTP/1.1
Host: www.server.com
Content-Type: Application/XML
Content-Length: 667
<?XML version = "1.0" encoding = "UTF-8"?>
<mailbox_backup_data_selection_request>
    <response_identifier>ID_request_3</response_identifier>
    <mailbox_backup_data_list>
        ...
    </mailbox_backup_data_list>
</mailbox_backup_data_selection_request>
```

The client 202 may send a mailbox backup data selection response 237 to the OVDR virtualization server 206 with a selection of mailbox backup data to recover. In one implementation, the mailbox backup data selection response may include data such as a request identifier, a selection of mailbox backup data to recover, TEE lifetime, and/or the like. In one embodiment, the client may provide the following example mailbox backup data selection response, substantially in the form of a HTTP(S) POST message including XML-formatted data, as provided below:

```
POST /mailbox_backup_data_selection_response.php HTTP/1.1
Host: www.server.com
Content-Type: Application/XML
```

```
Content-Length: 667
<?XML version = "1.0" encoding = "UTF-8"?>
<mailbox_backup_data_selection_response>
    <request_identifier>ID_response_3</request_identifier>
    <recovery_selection>
        <account>
            <account_identifier>account_1@email_provider.com</account_identifier>
            <first_name>John</first_name>
            <last_name>Smith</last_name>
            <snapshot>
                <snapshot_identifier>12/20/2019_2:52PM</snapshot_identifier>
                <dataset>
                    <email>
                        <folder>Inbox</folder>
                        <folder>Sent</folder>
                    </email>
                </dataset>
            </snapshot>
        </account>
    </recovery_selection>
    <TEE_lifetime>6 hours</TEE_lifetime>
</mailbox_backup_data_selection_response>
```

A temporary Exchange environment provisioning (TEEP) component 241 may utilize data provided in the mailbox backup data selection response to facilitate mailbox data recovery of the selected mailbox backup data by provisioning and/or allocating capacity on a virtualized temporary Exchange environment. See FIG. 3 for additional details regarding the TEEP component.

The OVDR virtualization server 206 may send a mailbox creation request 245 to the temporary Exchange environment server 210 to facilitate creating an Exchange mailbox for the selected mailbox backup data. In one implementation, the mailbox creation request may include data such as a request identifier, a request type, an account identifier, an alias, a password, a first name, a last name, and/or the like. In one embodiment, the OVDR virtualization server may provide the following example mailbox creation request, substantially in the form of a HTTP(S) POST message including XML-formatted data, as provided below:

```
POST /mailbox_creation_request.php HTTP/1.1
Host: www.server.com
Content-Type: Application/XML
Content-Length: 667
<?XML version = "1.0" encoding = "UTF-8"?>
<mailbox_creation_request>
    <request_identifier>ID_request_4</request_identifier>
    <request_type>CREATE_MAILBOX</request_type>
    <account_identifier>account_1@email_provider.com</account_identifier>
    <password>password for user to access the TEE</password>
    <first_name>John</first_name>
    <last_name>Smith</last_name>
</mailbox_creation_request>
```

The temporary Exchange environment server 210 may send a mailbox creation response 249 to the OVDR virtualization server 206 to confirm whether the Exchange mailbox for the selected mailbox backup data was created successfully. In one implementation, the mailbox creation response may include data such as a response identifier, a status, and/or the like. In one embodiment, the temporary Exchange environment server may provide the following example mailbox creation response, substantially in the form of a HTTP(S) POST message including XML-formatted data, as provided below:

```
POST /mailbox_creation_response.php HTTP/1.1
Host: www.server.com
Content-Type: Application/XML
Content-Length: 667
<?XML version = "1.0" encoding = "UTF-8"?>
<mailbox_creation_response>
    <response_identifier>ID_response_4</response_identifier>
    <status>OK</status>
</mailbox_creation_response>
```

FIG. 2B shows one embodiment of how the data flow may proceed. In FIG. 2B, the OVDR virtualization server 206 may send a mailbox backup data retrieve request 253 to the backup repository 214 to facilitate retrieving the selected mailbox backup data. In one implementation, the mailbox backup data retrieve request may include data such as a request identifier, a request type, a user identifier, a description of mailbox backup data to retrieve, and/or the like. In one embodiment, the OVDR virtualization server may provide the following example mailbox backup data retrieve request, substantially in the form of a HTTP(S) POST message including XML-formatted data, as provided below:

```
POST /mailbox_backup_data_retrieve_request.php HTTP/1.1
Host: www.server.com
Content-Type: Application/XML
Content-Length: 667
<?XML version = "1.0" encoding = "UTF-8"?>
<mailbox_backup_data_retrieve_request>
    <request_identifier>ID_request_5</request_identifier>
    <request_type>DATA_RETRIEVE</request_type>
    <user_identifier>ID_user_1</user_identifier>
    <account_identifier>account_1@email_provider.com</account_identifier>
    <snapshot>
        <snapshot_identifier>12/20/2019_2:52PM</snapshot_identifier>
        <dataset>
            <email>
                <folder>Inbox</folder>
                <folder>Sent</folder>
            </email>
        </dataset>
    </snapshot>
</mailbox_backup_data_retrieve_request>
```

The backup repository 214 may send a mailbox backup data retrieve response 257 to the OVDR virtualization server 206 with the requested mailbox backup data to retrieve (e.g., as an Outlook Data File in PST file format). In one implementation, the mailbox backup data retrieve response may include data such as a response identifier, the requested mailbox backup data, and/or the like. In one embodiment, the backup repository may provide the following example mailbox backup data retrieve response, substantially in the form of a HTTP(S) POST message including XML-formatted data, as provided below:

```
POST /mailbox_backup_data_retrieve_response.php HTTP/1.1
Host: www.server.com
Content-Type: Application/XML
Content-Length: 667
<?XML version = "1.0" encoding = "UTF-8"?>
<mailbox_backup_data_retrieve_response>
    <response_identifier>ID_response_5</response_identifier>
    <mailbox_backup_data>MailboxBackupData.pst</mailbox_backup_data>
</mailbox_backup_data_retrieve_response>
```

The OVDR virtualization server 206 may send a mailbox data restore request 261 to the temporary Exchange environment server 210 to facilitate restoring the selected mailbox backup data into the created Exchange mailbox on the TEE. In one implementation, the mailbox data restore request may include data such as a request identifier, a request type, an account identifier, mailbox backup data, and/or the like. In one embodiment, the OVDR virtualization server may provide the following example mailbox data restore request, substantially in the form of a HTTP(S) POST message including XML-formatted data, as provided below:

```
POST /mailbox_data_restore_request.php HTTP/1.1
Host: www.server.com
Content-Type: Application/XML
Content-Length: 667
<?XML version = "1.0" encoding = "UTF-8"?>
<mailbox_data_restore_request>
    <request_identifier>ID_request_6</request_identifier>
    <request_type>RESTORE_MAILBOX</request_type>
    <account_identifier>account_1@email_provider.com</account_identifier>
    <mailbox_backup_data>MailboxBackupData.pst</mailbox_backup_data>
</mailbox_data_restore_request>
```

The temporary Exchange environment server 210 may send a mailbox data restore response 265 to the OVDR virtualization server 206 to confirm whether the selected mailbox backup data was restored successfully. In one implementation, the mailbox data restore response may include data such as a response identifier, a status, and/or the like. In one embodiment, the temporary Exchange environment server may provide the following example mailbox data restore response, substantially in the form of a HTTP(S) POST message including XML-formatted data, as provided below:

```
POST /mailbox_data_restore_response.php HTTP/1.1
Host: www.server.com
Content-Type: Application/XML
Content-Length: 667
<?XML version = "1.0" encoding = "UTF-8"?>
<mailbox_data_restore_response>
    <response_identifier>ID_response_6</response_identifier>
    <status>OK</status>
</mailbox_data_restore_response>
```

In some alternative implementations, instead of using a mailbox data restore response, the OVDR virtualization server may periodically poll the temporary Exchange environment server to determine whether the restore operation has completed.

The OVDR virtualization server 206 may send a data recovery response 269 to the client 202 to inform the user that the TEE with the selected mailbox backup data is available for use and/or to facilitate user access to the TEE. For example, the data recovery response may be displayed using an OVDR website, application (e.g., a mobile app), sent via SMS, sent via email, and/or the like. In one implementation, the data recovery response may include data such as a response identifier, a TEE connection URL, a TEE password, and/or the like. In one embodiment, the OVDR virtualization server may provide the following example data recovery response, substantially in the form of a HTTP(S) POST message including XML-formatted data, as provided below:

```
POST /data_recovery_response.php HTTP/1.1
Host: www.server.com
Content-Type: Application/XML
Content-Length: 667
<?XML version = "1.0" encoding = "UTF-8"?>
<data_recovery_response>
    <response_identifier>ID_response_1</response_identifier>
    <TEE_connection_URL>https://OVDR_Website.com/ID_User_1</TEE_connection_URL>
    <TEE_password>password (e.g., randomLy generated)</TEE_password>
</data_recovery_response>
```

FIG. 2C shows another embodiment of how the data flow may proceed. In FIG. 2C, the OVDR virtualization server 206 may send a mailbox backup data retrieve request 253 to the backup repository 214 to instruct the backup repository to restore the selected mailbox backup data into the created Exchange mailbox on the TEE. In one implementation, the mailbox backup data retrieve request may include data such as a request identifier, a request type, a user identifier, a description of mailbox backup data to retrieve, and/or the like. In one embodiment, the OVDR virtualization server may provide the following example mailbox backup data retrieve request, substantially in the form of a HTTP(S) POST message including XML-formatted data, as provided below:

```
POST /mailbox_backup_data_retrieve_request.php HTTP/1.1
Host: www.server.com
Content-Type: Application/XML
Content-Length: 667
<?XML version = "1.0" encoding = "UTF-8"?>
<mailbox_backup_data_retrieve_request>
    <request_identifier>ID_request_5</request_identifier>
    <request_type>DATA_RETRIEVE_TO_TEE</request_type>
    <TEE_identifier>ID_TEE_1</TEE_identifier>
    <user_identifier>ID_user_1</user_identifier>
    <account_identifier>account_1@email_provider.com</account_identifier>
    <snapshot>
        <snapshot_identifier>12/20/2019_2:52PM</snapshot_identifier>
        <dataset>
            <email>
                <folder>Inbox</folder>
                <folder>Sent</folder>
            </email>
        </dataset>
    </snapshot>
</mailbox_backup_data_retrieve_request>
```

The backup repository 214 may send a mailbox data restore request 257 to the temporary Exchange environment server 210 to facilitate restoring the selected mailbox backup data into the created Exchange mailbox on the TEE. In one implementation, the mailbox data restore request may include data such as a request identifier, a request type, an account identifier, mailbox backup data, and/or the like. In one embodiment, the backup repository may provide the following example mailbox data restore request, substantially in the form of a HTTP(S) POST message including XML-formatted data, as provided below:

```
POST /mailbox_data_restore_request.php HTTP/1.1
Host: www.server.com
Content-Type: Application/XML
Content-Length: 667
<?XML version = "1.0" encoding = "UTF-8"?>
<mailbox_data_restore_request>
    <request_identifier>ID_request_6</request_identifier>
    <request_type>RESTORE_MAILBOX</request_type>
    <account_identifier>account_1@email_provider.com</account_identifier>
    <mailbox_backup_data>MailboxBackupData.pst</mailbox_backup_data>
</mailbox_data_restore_request>
```

The temporary Exchange environment server 210 may send a mailbox data restore response 261 to the backup repository 214 to confirm whether the selected mailbox backup data was restored successfully. In one implementation, the mailbox data restore response may include data such as a response identifier, a status, and/or the like. In one embodiment, the temporary Exchange environment server may provide the following example mailbox data restore response, substantially in the form of a HTTP(S) POST message including XML-formatted data, as provided below:

```
POST /mailbox_data_restore_response.php HTTP/1.1
Host: www.server.com
Content-Type: Application/XML
Content-Length: 667
<?XML version = "1.0" encoding = "UTF-8"?>
<mailbox_data_restore_response>
    <response_identifier>ID_response_6</response_identifier>
    <status>OK</status>
</mailbox_data_restore_response>
```

The backup repository 214 may send a mailbox backup data retrieve response 265 to the OVDR virtualization server 206 to confirm whether the selected mailbox backup data was restored successfully. In one implementation, the mailbox backup data retrieve response may include data such as a response identifier, a status, and/or the like. In one embodiment, the temporary Exchange environment server may provide the following example mailbox backup data retrieve response, substantially in the form of a HTTP(S) POST message including XML-formatted data, as provided below:

```
POST /mailbox_backup_data_retrieve_response.php HTTP/1.1
Host: www.server.com
Content-Type: Application/XML
Content-Length: 667
<?XML version = "1.0" encoding = "UTF-8"?>
<mailbox_backup_data_retrieve_response>
    <response_identifier>ID_response_5</response_identifier>
    <status>OK</status>
</mailbox_backup_data_retrieve_response>
```

In some alternative implementations, instead of using a mailbox backup data retrieve response, the OVDR virtualization server may periodically poll the backup repository to determine whether the restore operation has completed.

The OVDR virtualization server 206 may send a data recovery response 269 to the client 202 to inform the user that the TEE with the selected mailbox backup data is available for use and/or to facilitate user access to the TEE. For example, the data recovery response may be displayed using an OVDR website, application (e.g., a mobile app), sent via SMS, sent via email, and/or the like. In one implementation, the data recovery response may include data such as a response identifier, a TEE connection URL, a TEE password, and/or the like. In one embodiment, the OVDR virtualization server may provide the following example data recovery response, substantially in the form of a HTTP(S) POST message including XML-formatted data, as provided below:

```
POST /data_recovery_response.php HTTP/1.1
Host: www.server.com
Content-Type: Application/XML
Content-Length: 667
<?XML version = "1.0" encoding = "UTF-8"?>
<data_recovery_response>
    <response_identifier>ID_response_1</response_identifier>
    <TEE_connection_URL>https://OVDR_Website.com/ID_User_1</TEE_connection_URL>
    <TEE_password>password (e.g., randomly generated)</TEE_password>
</data_recovery_response>
```

FIG. 3 shows a logic flow illustrating embodiments of a temporary Exchange environment provisioning (TEEP) component for the OVDR. In FIG. 3, a data recovery request may be obtained at 301. For example, the data recovery request may be obtained as a result of a user request to facilitate mailbox data recovery.

A user associated with the data recovery request may be determined at 305. For example, different users may have access to different mailbox backup data (e.g., a regular user may have access to the user's mailbox backup data; an administrative user may have access to mailbox backup data of users in a group, company, and/or the like entity). In one implementation, the data recovery request may be parsed (e.g., using PHP commands) to determine the associated user (e.g., based on the value of the user_identifier field).

Available mailbox backup data accessible to the user may be determined at 309. For example, available mailbox backup data may include a list of user accessible accounts, a list of point-in-time snapshots for each account, a list of items (e.g., folders, emails, calendar entries, contacts, tasks, notes) for each snapshot, and/or the like. In one implementation, the available mailbox backup data may be obtained via a mailbox backup data search response from a backup repository. In various embodiments, the backup repository may be a database storing set of items for each user (e.g., obtained by querying Exchange server APIs (e.g., Office365) at regular frequencies to access and store any new data items for a user) as well as search metadata (e.g., sender, recipient, email subject, etc.) that may be used to look up and retrieve each data item, a System Center Data Protection Manager, a database of Exchange-aware Volume Shadow Copy Service (VSS) based backups, a database of Exchange mailboxes in PST file format, and/or the like. In one implementation, the available mailbox backup data may be determined from the database via one or more SQL queries. In another implementation, the available mailbox backup data may be determined from the System Center Data Protection Manager using a set of PowerShell commands (e.g., Get-DPMRecoverableItem cmdlet). In another implementation, the available mailbox backup data may be determined from VSS-based backups using a set of PowerShell commands (e.g., Get-Mailbox cmdlet, Get-MailboxFolder cmdlet). In another implementation, the available mailbox backup data may be determined from PST file backups using a set of PST file format SDK commands.

The user's mailbox backup data subset selection may be obtained at 313. For example, the mailbox backup data subset selection may specify a subset of the available mailbox backup data that the user wishes to recover. In one embodiment, the user may utilize OVDR UI to select an account to recover. For example, the user may sort and/or filter the list of user accessible accounts. In another example, the user may select a snapshot of a selected account to recover. In another embodiment, the user may utilize OVDR UI to indicate that items matching a specified search term should be recovered. For example, the search term may be utilized to search through items in one or more selected accounts, snapshots, folders, and/or the like. In another embodiment, the user may utilize OVDR UI to select items that should be recovered. For example, the user may select items from a selected account snapshot or from items matching a specified search term. In one implementation, the mailbox backup data subset selection may be obtained via a mailbox backup data selection response.

A determination may be made at 317 regarding which TEE to use to recover the selected mailbox backup data. If a new TEE should be used, the new TEE may be provisioned at 321. In one embodiment, a new TEE may be provisioned for each data recovery request. In another embodiment, a new TEE may be provisioned if allocating capacity on an existing TEE would exceed a service capacity threshold (e.g., up to 100 Exchange mailboxes or users) of the existing TEE. In one implementation, a virtual machine executing an Exchange server may be launched to provision the new TEE. For example, the virtual machine may be launched using the following HTTP request:
    POST/<customerId>/createTEE?lifetime=<TEE lifetime>&principalId=<user principal name>

For example, lifetime (e.g., specified by the user; specified by a default value), connection information (e.g., the hostname and port used to communicate with the TEE by EWS API; the web URL used to access the Outlook Web App of the TEE; the URL used to connect an Exchange client to the TEE), and/or the like configuration settings of the new TEE may be set.

If an existing TEE should be used, capacity on the existing TEE may be allocated at 325. In various embodiments, an existing TEE may be used to host Exchange mailboxes associated with data recovery requests of the user, of an entity associated with the user (e.g., group, company), of any set of users, and/or the like. In some implementations, a TEE service capacity tracker may be adjusted to reflect capacity of the existing TEE allocated for handling the user's mailbox data recovery. For example, the TEE service capacity tracker may be a variable that tracks the number of Exchange mailboxes or users handled by the existing TEE. In various embodiments, an existing TEE to be used for handling the user's mailbox data recovery may be selected by applying heuristics to determine a suitable existing TEE to use (e.g., based on which existing data subsets are assigned to which existing TEEs). In one implementation, a cap on the number of mailboxes on each TEE may be instituted (e.g., up to 100 active mailboxes per TEE). For example, when selecting which TEE to use, the OVDR may determine which TEEs have fewer than 100 mailboxes and may select any available server meeting that threshold. In another implementation, each user or entity may be assigned their own dynamically-provisioned TEE. For example, when selecting which TEE to use, the OVDR may determine whether a TEE already exists for a user or entity, and if one already exists, may use the existing one. In another implementation, storage space usage of each TEE may be tracked (e.g., via an out-of-band background process). For example, when selecting which TEE to use, the OVDR may determine which TEEs have sufficient storage space to handle the user's mailbox data recovery and may select any available server with sufficient storage space.

A determination may be made at 329 whether the TEE used to recover the selected mailbox backup data is available. If not, the TEEP component may wait at 333. In one implementation, the TEEP component may wait a specified period of time (e.g., 30 seconds) predetermined to be sufficient for the TEE to be available. In another implementation, the OVDR may periodically (e.g., every 5 seconds) poll a TEE API to check whether the TEE is available.

If the TEE is available, a determination may be made at 337 whether there remain accounts specified in the selected mailbox backup data to process. In one implementation, each of the accounts specified in the selected mailbox backup data may be processed. If there remain accounts to process, the next account may be selected for processing at 341.

An Exchange mailbox for the selected account may be created at 345. In various implementations, the Exchange mailbox may be created using the EWS API, PowerShell commands, and/or the like. For example, the Exchange mailbox for the selected account may be created using the following HTTP API command:

```
PUT /<customerId>/createUser - Creates an Exchange mailbox. Accepts HTTP query params
    $principalName (e.g., email address), $alias, $password, $firstName, $lastName
```

In one implementation, the connection information for the created mailbox (e.g., the username and password used to connect to the created mailbox on the TEE) is added to the aggregate connection information of the TEE. For example, a random password may be generated for the created mailbox (e.g., that satisfies a set of password strength criteria). In another example, the password associated with the selected account may be used as the password for the created mailbox.

Selected mailbox backup data subset associated with the selected account may be fetched into the created mailbox at 349. For example, a PST mailbox may be restored into the created Exchange mailbox. In another example, selected mailbox folders, emails, calendar entries, contacts, tasks, notes and/or the like may be restored into the created Exchange mailbox. In one embodiment, the selected mailbox backup data subset may be retrieved by an OVDR virtualization server (e.g., via a mailbox backup data retrieve response) from the backup repository, and restored into the created Exchange mailbox (e.g., via a mailbox data restore request). In another embodiment, the selected mailbox backup data subset may be restored into the created Exchange mailbox (e.g., via a mailbox data restore request) by the backup repository upon a request (e.g., via a mailbox backup data retrieve request) from an OVDR virtualization server. In various implementations, the selected mailbox backup data subset may be restored using the EWS API, PowerShell commands, and/or the like. For example, the selected mailbox backup data subset may be restored using the following HTTP API commands:

```
PUT /<customerId>/startPst - Starts a PST mailbox export for the provided principal
    name. Accepts query param $principalName
PUT /<customerId>/pollPst - Polls to check whether the PST export with the provided
    principal name has completed. Accepts query param $principalName
```

The TEE used to recover the selected mailbox backup data may be marked as ready for the user at 353. In one implementation, the TEE may be marked as ready for the user once mailboxes for the accounts specified in the selected mailbox backup data have been restored into the TEE (e.g., determined based on results of polling commands for each account).

An access notification may be sent to the user at 357. For example, the access notification may be sent via OVDR UI, SMS, email, and/or the like. In various implementations, the access notification may include hyperlinks to a management screen and/or to connect to each of the user's mailboxes in the TEE, the aggregate connection information (e.g., TEE connection information, connection information for each of the created mailboxes), and/or the like allowing the user to connect to mailboxes in the TEE via Outlook Web App or via Outlook client. In some implementations, the access notification may be sent to another user (e.g., when an administrative user sends a data recovery request on behalf of a regular user).

A determination may be made at 361 whether the lifetime of the TEE used to recover the selected mailbox backup data has expired. In one implementation, the mailbox backup data selection response may be parsed (e.g., using PHP commands) to determine the lifetime (e.g., based on the value of the TEE_lifetime field). In another implementation, a configuration setting may be checked to determine the lifetime (e.g., default value of 6 hours). In some implementations, the user (e.g., an administrative user and/or a regular user) may request an extension of the lifetime of the TEE (e.g., via the management screen). If the lifetime has not expired, the TEEP component may wait at 365 while the user interacts with their TEE as though it were a regular, permanent Exchange environment (e.g., in some implementation sending and/or receiving email via the temporary Exchange environment may be disabled).

If the lifetime has expired, a determination may be made at 369 whether a new TEE or an existing TEE was used to recover the selected mailbox backup data. If a new TEE was used, the new TEE may be deprovisioned at 373. In one implementation, the virtual machine executing the new TEE may be terminated. If an existing TEE was used, the capacity used to recover the selected mailbox backup data on the existing TEE may be deallocated at 377. In various implementations, the created Exchange mailboxes may be deleted using the EWS API, PowerShell commands, and/or the like. For example, an Exchange mailbox associated with the data recovery request of the user may be deleted using the following HTTP API command:

PUT /<customerId>/deleteUser - Deletes an Exchange mailbox. Accepts query param
    $principalName In some implementations, the TEE service capacity tracker may be adjusted to reflect the deallocation of the capacity on the existing TEE.

An access revocation notification may be sent to the user at 381. For example, the access revocation notification may be sent via OVDR UI, SMS, email, and/or the like. In one implementation, the access revocation notification may indicate that the TEE is no longer available. In another implementation, OVDR UI may be updated to not include the TEE in the management screen.

FIG. 4 shows a screenshot illustrating user interface(s) of the OVDR. In FIG. 4, an exemplary user interface (e.g., for a mobile device, for a website) for obtaining a user's mailbox backup data subset selection is illustrated. Screen 401 shows that a user may utilize a user selection widget 405 to specify a selected user whose mailbox backup data may be recovered. For example, an administrative user may have access to mailbox backup data of users in a group, company, and/or the like entity. In another example, the user widget may be set to the user and/or disabled (e.g., not shown) for a non-administrative user. The user may utilize an account selection widget 410 to select an account of the selected user from which mailbox backup data may be recovered. For example, the selected user may have multiple email accounts. The user may utilize a snapshot selection widget 415 to select a restore point associated with the selected account from which mailbox backup data may be recovered. The user may utilize a filter input widget 420 to specify search terms used to filter data associated with the selected restore point, from which mailbox backup data may be selected by the user. The user may utilize a search widget 425 to populate a data item selection widget 430 with mailbox backup data that matches the specified search selections (e.g., data items for the selected user, for the selected account, for the selected restore point that match the specified search terms). The user may utilize the data item selection widget 430 to select mailbox backup data items to recover. For example, the user may select folders, emails, calendar entries, contacts, tasks, notes, and/or the like. The user may utilize a select widget 440 to submit the user's mailbox backup data subset selection.

FIGS. 5-16 show screenshots illustrating user interfaces of the OVDR. In FIGS. 5-16, exemplary user interfaces (e.g., for a mobile device, for a website) for interacting with the OVDR are illustrated. Screen 501 shows that a user may utilize a Users tab to specify a selected user and/or a selected account whose mailbox backup data may be recovered. For example, the user may select (e.g., click on) 505 user Reggie Regression having account identified by email address reggie@devman1.onmicrosoft.com as the selected user and the selected account.

Screens 601, 701, 801 and 901 show that the user may utilize a Search tab to select a subset of the available mailbox backup data for the selected account that the user wishes to recover. Screen 601 shows that the user may utilize a Snapshot Selector widget 605 to select a snapshot (e.g., December 20$^{th}$ at 7:59 am, or December 20$^{th}$ at 2:52 pm) from which to recover data items. Screen 701 shows that the user may utilize a Data Set widget 705 to select different data sets (e.g., email, contacts, calendar, tasks) from which to recover data items. Screen 801 shows that the user may utilize a Search Account widget 805 to filter data items to recover using search terms. Screen 901 shows that the user may select data items to recover from one or more data sets. For example, the user may choose email folders Inbox 905A and Sent Items 905B (e.g., including emails inside these folders) as the selected subset of the available mailbox backup data for the selected account that the user wishes to recover. It is to be understood that the user may choose to recover data items from multiple data sets or to recover the entire snapshot.

Screen 1001 shows that the user may utilize a Virtualize widget 1005 to indicate that the user wishes to recover the selected mailbox backup data for the selected account using a TEE. For example, the user may choose to recover the entire snapshot or the selected data items.

Screens 1101, 1201, 1401 and 1601 show that the user may utilize a VMs tab (e.g., a management screen) to administer and/or interact with the user's TEEs. Screen 1101 shows that the user may view the status 1105 of the TEE used to recover the selected mailbox backup data. For example, the status may indicate that setup of the TEE is currently in progress. Screen 1201 shows that the user may view the status 1205 of the TEE used to recover the selected mailbox backup data. For example, the status may indicate that setup of the TEE has been completed. Screen 1201 also shows that the user may utilize a Connect to VM widget 1210 to connect to the TEE. In one implementation, the Connect to VM widget may comprise the web URL used to access the Outlook Web App of the TEE. For example, the web URL may specify the user name and/or password used to access the recovered mailbox. Screen 1301 shows a login screen of the Outlook Web App of the TEE. In one embodiment, a user name widget 1305 and/or a password widget 1310 may be prepopulated with the user name and/or password, respectively, used to access the recovered mailbox, as specified by the web URL. In another embodiment, the user may copy the user name and/or password used to access the recovered mailbox from 1215 and/or 1405, respectively, and paste the user name and/or password into the user name widget 1305 and/or the password widget 1310, respectively. Screen 1401 shows that the user may utilize a Copy VM Password widget 1405 to copy the password used to access the recovered mailbox. Screen 1501 shows that the user may utilize the Outlook Web App of the TEE to access the recovered mailbox backup data. Screen 1601 shows that the user may utilize a Download PST widget 1605 to download the recovered mailbox backup data in PST file format.

Additional Alternative Embodiment Examples

The following alternative example embodiments provide a number of variations of some of the core principles already discussed for expanded color on the abilities of the OVDR.

FIG. 17 shows implementation case(s) for the OVDR. In FIG. 17, an exemplary sequence of steps involved in provisioning or allocating a temporary Exchange environment and populating it with data is illustrated. This diagram shows multiple alternatives in several steps:

1. The virtualization system may use one of two approaches when assigning an Exchange environment to a data subset: a) it can provision a brand-new environment; or b) it can allocate capacity in an existing environment. The allocation process would ensure that not too many allocations were made to a single environment, to avoid providing poor service to users placed in that environment.

2. After provisioning or allocation, the Virtualization system may ensure that the Exchange environment is fully available. It may either (a) poll the environment, repeatedly checking until the environment is available; or (b) the provisioning request may return a response indicating provisioning has succeeded.

3. Upon expiry of the environment (or upon expiry of the allocation of the environment capacity), the environment may be either destroyed or un-allocated, depending on the approach used above in 1.

OVDR Controller

FIG. 18 shows a block diagram illustrating embodiments of a OVDR controller. In this embodiment, the OVDR controller 1801 may serve to aggregate, process, store, search, serve, identify, instruct, generate, match, and/or facilitate interactions with a computer through backup systems technologies, and/or other related data.

Users, which may be people and/or other systems, may engage information technology systems (e.g., computers) to facilitate information processing. In turn, computers employ processors to process information; such processors 1803 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 1829 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the OVDR controller 1801 may be connected to and/or communicate with entities such as, but not limited to: one or more users from peripheral devices 1812 (e.g., user input devices 1811); an optional cryptographic processor device 1828; and/or a communications network 1813.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The OVDR controller 1801 may be based on computer systems that may comprise, but are not limited to, components such as: a computer systemization 1802 connected to memory 1829.

Computer Systemization

A computer systemization 1802 may comprise a clock 1830, central processing unit ("CPU(s)" and/or "processor(s)" (these terms are used interchangeable throughout the disclosure unless noted to the contrary)) 1803, a memory 1829 (e.g., a read only memory (ROM) 1806, a random access memory (RAM) 1805, etc.), and/or an interface bus 1807, and most frequently, although not necessarily, are all interconnected and/or communicating through a system bus 1804 on one or more (mother)board(s) 1802 having conductive and/or otherwise transportive circuit pathways through which instructions (e.g., binary encoded signals) may travel to effectuate communications, operations, storage, etc. The computer systemization may be connected to a power source 1886; e.g., optionally the power source may be internal. Optionally, a cryptographic processor 1826 may be connected to the system bus. In another embodiment, the cryptographic processor, transceivers (e.g., ICs) 1874, and/or sensor array (e.g., accelerometer, altimeter, ambient light, barometer, global positioning system (GPS) (thereby allowing OVDR controller to determine its location), gyroscope, magnetometer, pedometer, proximity, ultra-violet sensor, etc.) 1873 may be connected as either internal and/or external peripheral devices 1812 via the interface bus I/O 1808 (not pictured) and/or directly via the interface bus 1807. In turn, the transceivers may be connected to antenna(s) 1875, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11 g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n, Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1829 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's DragonBall® and PowerPC®; IBM's® and Sony's® Cell processor; Intel's® 80X86 series (e.g., 80386, 80486), Pentium®, Celeron®, Core (2) Duo®, i series (e.g., i3, i5, i7, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to various data processing techniques. Such instruction passing facilitates communication within the OVDR controller and beyond through various interfaces. Should processing requirements dictate a greater amount speed and/or capacity, distributed processors (e.g., see Distributed OVDR below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the OVDR may be achieved by implementing a microcontroller such as CAST's® R8051XC2 microcontroller; Intel's® MCS 51 (i.e., 8051 microcontroller); and/or the like. Also, to implement certain features of the OVDR, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the OVDR component collection (distributed or otherwise) and/or features may be implemented via the microprocessor and/or via embedded components; e.g., via ASIC, coprocessor, DSP, FPGA, and/or the like. Alternately, some implementations of the OVDR may be implemented with embedded components that are configured and used to achieve a variety of features or signal processing.

Depending on the particular implementation, the embedded components may include software solutions, hardware solutions, and/or some combination of both hardware/software solutions. For example, OVDR features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the OVDR features. A hierarchy of programmable interconnects allow logic blocks to be interconnected as needed by the OVDR system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the OVDR may be developed on FPGAs and then migrated into a fixed version that more resembles ASIC implementations. Alternate or coordinating implementations may migrate OVDR controller features to a final ASIC instead of or in addition to FPGAs. Depending on the implementation all of the aforementioned embedded components and microprocessors may be considered the "CPU" and/or "processor" for the OVDR.

Power Source

The power source 1886 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1886 is connected to at least one of the interconnected subsequent components of the OVDR thereby providing an electric current to all subsequent components. In one example, the power source 1886 is connected to the system bus component 1804. In an alternative embodiment, an outside power source 1886 is provided through a connection across the I/O 1808 interface. For example, a USB and/or IEEE 1394 connection carries both data and power across the connection and is therefore a suitable source of power.

Interface Adapters

Interface bus(ses) 1807 may accept, connect, and/or communicate to a number of interface adapters, variously although not necessarily in the form of adapter cards, such as but not limited to: input output interfaces (I/O) 1808, storage interfaces 1809, network interfaces 1810, and/or the like. Optionally, cryptographic processor interfaces 1827 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1809 may accept, communicate, and/or connect to a number of storage devices such as, but not limited to: storage devices 1814, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1810 may accept, communicate, and/or connect to a communications network 1813. Through a communications network 1813, the OVDR controller is accessible through remote clients 1833b (e.g., computers with web browsers) by users 1833a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed OVDR below), architectures may similarly be employed to pool, load balance, and/or otherwise decrease/increase the communicative bandwidth required by the OVDR controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 1810 may be used to engage with various communications network types 1813. For example, multiple network interfaces may be employed to allow for the communication over broadcast, multicast, and/or unicast networks.

Input Output interfaces (I/O) 1808 may accept, communicate, and/or connect to user, peripheral devices 1812 (e.g., input devices 1811), cryptographic processor devices 1828, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 1812 may be connected and/or communicate to I/O and/or other facilities of the like such as network interfaces, storage interfaces, directly to the interface bus, system bus, the CPU, and/or the like. Peripheral devices may be external, internal and/or part of the OVDR controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 1811 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the OVDR controller may be embodied as an embedded, dedicated, and/or monitor-less (i.e., headless) device, wherein access would be provided over a network interface connection.

Cryptographic units such as, but not limited to, microcontrollers, processors 1826, interfaces 1827, and/or devices 1828 may be attached, and/or communicate with the OVDR controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+MB/s of cryptographic instructions; VLSI Technology's® 33 MHz 6868; and/or the like.

Memory

Generally, any mechanization and/or embodiment allowing a processor to affect the storage and/or retrieval of information is regarded as memory 1829. However, memory is a fungible technology and resource, thus, any number of memory embodiments may be employed in lieu of or in concert with one another. It is to be understood that the OVDR controller and/or a computer systemization may employ various forms of memory 1829. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 1829 will include ROM 1806, RAM 1805, and a storage device 1814. A storage device 1814 may be any various computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 1829 may contain a collection of program and/or database components and/or data such as, but not limited to: operating system component(s) 1815 (operating system); information server component(s) 1816 (information server); user interface component(s) 1817 (user interface); Web browser component(s) 1818 (Web browser); database(s) 1819; mail server component(s) 1821; mail client component(s) 1822; cryptographic server component(s) 1820 (cryptographic server); the OVDR component(s) 1835; and/or the like (i.e., collectively a component collection). These components may be stored and accessed from the storage devices and/or from storage devices accessible through an interface bus. Although unconventional program components such as those in the component collection may be stored in a local storage device 1814, they may also be loaded and/or stored in memory such as: peripheral devices, RAM, remote storage facilities through a communications network, ROM, various forms of memory, and/or the like.

Operating System

The operating system component 1815 is an executable program component facilitating the operation of the OVDR controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millenium/Mobile/NT/Vista/XP (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the OVDR controller to communicate with other entities through a communications network 1813. Various communication protocols may be used by the OVDR controller as a subcarrier transport mechanism for interaction, such as, but not limited to: multicast, TCP/IP, UDP, unicast, and/or the like.

Information Server

An information server component 1816 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C(++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects®, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the OVDR controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the OVDR database 1819, operating systems, other program components, user interfaces, Web browsers, and/or the like.

Access to the OVDR database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the OVDR. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, wherein the resulting command is provided over the bridge mechanism to the OVDR as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, menus, scrollers, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other web-browser/cloud based client OSs); Microsoft's Windows® varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface®, any of which may be used and) provide a baseline and means of accessing and displaying information graphically to users.

A user interface component 1817 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1818 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the OVDR enabled nodes. The combined application may be nugatory on systems employing Web browsers.

Mail Server

A mail server component 1821 is a stored program component that is executed by a CPU 1803. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C(++), C# and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the OVDR. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the OVDR mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1822 is a stored program component that is executed by a CPU 1803. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1820 is a stored program component that is executed by a CPU 1803, cryptographic processor 1826, cryptographic processor interface 1827, cryptographic processor device 1828, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the OVDR may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to allow the OVDR component to engage in secure transactions if so desired. The cryptographic component facilitates the secure accessing of resources on the OVDR and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The OVDR Database

The OVDR database component 1819 may be embodied in a database and its stored data. The database is a stored program component, which is executed by the CPU; the stored program component portion configuring the CPU to process the stored data. The database may be a fault tolerant, relational, scalable, secure database such as MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the OVDR database may be implemented using various other data-structures, such as an array, hash, (linked) list, struct, structured text file (e.g., XML), table, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the OVDR database is implemented as a data-structure, the use of the OVDR database 1819 may be integrated into another component such as the OVDR component 1835. Also, the database may be implemented as a mix of data structures, objects, and relational structures. Databases may be consolidated and/or distributed in countless variations (e.g., see Distributed OVDR below). Portions of databases, e.g., tables, may be exported and/or imported and thus decentralized and/or integrated.

In one embodiment, the database component 1819 includes several tables 1819a-j:

An accounts table 1819a includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 1819b includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a OVDR);

An devices table 1819c includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 1819d includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 1819e includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 1819f includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 1819g includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 1819*h* includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 1819*i* includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMedialD, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

A mailboxes table 1819*j* includes fields such as, but not limited to: mailboxID, userID, mailboxPrincipalAccountldentifier, mailboxAlias, mailboxFirstName, mailboxLastName, mailboxPassword, mailboxSnapshotTime, mailboxDataltems, mailboxExpirationTime, and/or the like.

In one embodiment, the OVDR database may interact with other database systems. For example, employing a distributed database system, queries and data access by search OVDR component may treat the combination of the OVDR database, an integrated data security layer database as a single database entity (e.g., see Distributed OVDR below).

In one embodiment, user programs may contain various user interface primitives, which may serve to update the OVDR. Also, various accounts may require custom database tables depending upon the environments and the types of clients the OVDR may need to serve. It should be noted that any unique fields may be designated as a key field throughout. In an alternative embodiment, these tables have been decentralized into their own databases and their respective database controllers (i.e., individual database controllers for each of the above tables). Employing various data processing techniques, one may further distribute the databases over several computer systemizations and/or storage devices. Similarly, configurations of the decentralized database controllers may be varied by consolidating and/or distributing the various database components 1819*a-j*. The OVDR may be configured to keep track of various settings, inputs, and parameters via database controllers.

The OVDR database may communicate to and/or with other components in a component collection, including itself, and/or facilities of the like. Most frequently, the OVDR database communicates with the OVDR component, other program components, and/or the like. The database may contain, retain, and provide information regarding other nodes and data.

The OVDRs

The OVDR component 1835 is a stored program component that is executed by a CPU. In one embodiment, the OVDR component incorporates any and/or all combinations of the aspects of the OVDR that was discussed in the previous figures. As such, the OVDR affects accessing, obtaining and the provision of information, services, transactions, and/or the like across various communications networks. The features and embodiments of the OVDR discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the OVDR's features and facilities, and in many cases reduce the costs, energy consumption/requirements, and extend the life of OVDR's underlying infrastructure; this has the added benefit of making the OVDR more reliable. Similarly, many of the features and mechanisms are designed to be easier for users to use and access, thereby broadening the audience that may enjoy/employ and exploit the feature sets of the OVDR; such ease of use also helps to increase the reliability of the OVDR. In addition, the feature sets include heightened security as noted via the Cryptographic components 1820, 1826, 1828 and throughout, making access to the features and data more reliable and secure The OVDR transforms data recovery request, mailbox backup data selection response inputs, via OVDR components (e.g., TEEP), into mailbox backup data selection request, data recovery response outputs.

The OVDR component enabling access of information between nodes may be developed by employing various development tools and languages such as, but not limited to: Apache® components, Assembly, ActiveX, binary executables, (ANSI) (Objective-) C(++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the OVDR server employs a cryptographic server to encrypt and decrypt communications. The OVDR component may communicate to and/or with other components in a component collection, including itself, and/or facilities of the like. Most frequently, the OVDR component communicates with the OVDR database, operating systems, other program components, and/or the like. The OVDR may contain, communicate, generate, obtain, and/or provide program component, system, user, and/or data communications, requests, and/or responses.

Distributed OVDRs

The structure and/or operation of any of the OVDR node controller components may be combined, consolidated, and/ or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publicly accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through various data processing communication techniques.

The configuration of the OVDR controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for OVDR controller and/or OVDR component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the OVDR controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via an SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming communication
$sock = socket_create(AF_INET, SOCK_STREAM, 0);
socket_bind($sock, $address, $port) or die('Could not bind to address');
socket_listen($sock);
```

```
$client = socket_accept($sock);
// read input data from client device in 1024 byte blocks until end of message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference. Additional embodiments may include:

1. A temporary mailbox environment provisioning apparatus, comprising:
   a memory;
   a component collection in the memory, including:
      a temporary mailbox environment provisioning component;
   a processor disposed in communication with the memory, and configured to issue a plurality of processing instructions from the component collection stored in the memory,
      wherein the processor issues instructions from the temporary mailbox environment provisioning component, stored in the memory, to:
         obtain, via at least one processor, a mailbox data recovery request datastructure associated with a user;
         determine, via at least one processor, available mailbox backup data accessible to the user;
         obtain, via a user interface, a selection of a subset of the available mailbox backup data to recover;
         spawn, via at least one processor, a temporary mailbox environment associated with the mailbox data recovery request datastructure;
         create, via at least one processor, a mailbox, corresponding to a mailbox account included in the selected subset of the available mailbox backup data, on the temporary mailbox environment;
         restore, via at least one processor, mailbox data items, corresponding to mailbox data items associated with the mailbox account that are included in the selected subset of the available mailbox backup data, to the created mailbox; and
         generate, via at least one processor, an access notification indicating that the temporary mailbox environment is ready.

2. The apparatus of embodiment 1, wherein the user is an administrative user, and wherein the available mailbox backup data includes mailbox backup data for a plurality of other users.

3. The apparatus of embodiment 1, wherein the instructions to obtain the selection of the subset of the available mailbox backup data to recover further comprise instructions to:
   obtain, via at least one processor, a search term;
   filter, via at least one processor, the available mailbox backup data using the search term; and
   obtain, via a user interface, the selection of the subset of the available mailbox backup data to recover from the filtered available mailbox backup data.

4. The apparatus of embodiment 1, wherein the selection of the subset of the available mailbox backup data to recover includes a selection of one or more mailbox accounts.

5. The apparatus of embodiment 1, wherein the selection of the subset of the available mailbox backup data to recover includes a snapshot selection.

6. The apparatus of embodiment 1, wherein the selection of the subset of the available mailbox backup data to recover includes a selection of one or more mailbox data items.

7. The apparatus of embodiment 1, wherein a mailbox data item is one of: a folder, an email, a calendar entry, a contact, a task, a note.

8. The apparatus of embodiment 1, wherein the instructions to spawn the temporary mailbox environment further comprise instructions to provision a new temporary mailbox environment associated with the mailbox data recovery request datastructure.

9. The apparatus of embodiment 8, wherein the instructions to provision the new temporary mailbox environment further comprise instructions to launch a virtual machine executing an Exchange server.

10. The apparatus of embodiment 1, wherein the instructions to spawn the temporary mailbox environment further comprise instructions to allocate capacity, associated with the mailbox data recovery request datastructure, on an existing temporary mailbox environment.

11. The apparatus of embodiment 10, wherein the existing temporary mailbox environment is configured to host mailboxes associated with a specified entity associated with the user.

12. The apparatus of embodiment 1, further, comprising:
the processor issues instructions from the temporary mailbox environment provisioning component, stored in the memory, to:
generate, via at least one processor, a random password satisfying a set of password strength criteria; and
assign, via at least one processor, the generated password to the created mailbox.

13. The apparatus of embodiment 1, wherein the access notification includes a hyperlink facilitating access to the created mailbox on the temporary mailbox environment.

14. The apparatus of embodiment 8, further, comprising:
the processor issues instructions from the temporary mailbox environment provisioning component, stored in the memory, to:
determine, via at least one processor, that a lifetime associated with the temporary mailbox environment has expired; and
terminate, via at least one processor, the new temporary mailbox environment.

15. The apparatus of embodiment 10, further, comprising:
the processor issues instructions from the temporary mailbox environment provisioning component, stored in the memory, to:
determine, via at least one processor, that a lifetime associated with the temporary mailbox environment has expired; and
deallocate, via at least one processor, capacity associated with the mailbox data recovery request datastructure from the existing temporary mailbox environment.

16. A processor-readable temporary mailbox environment provisioning non-transient physical medium storing processor-executable components, the components, comprising:
a component collection stored in the medium, including:
a temporary mailbox environment provisioning component;
wherein the temporary mailbox environment provisioning component, stored in the medium, includes processor-issuable instructions to:
obtain, via at least one processor, a mailbox data recovery request datastructure associated with a user;
determine, via at least one processor, available mailbox backup data accessible to the user;
obtain, via a user interface, a selection of a subset of the available mailbox backup data to recover;
spawn, via at least one processor, a temporary mailbox environment associated with the mailbox data recovery request datastructure;
create, via at least one processor, a mailbox, corresponding to a mailbox account included in the selected subset of the available mailbox backup data, on the temporary mailbox environment;
restore, via at least one processor, mailbox data items, corresponding to mailbox data items associated with the mailbox account that are included in the selected subset of the available mailbox backup data, to the created mailbox; and
generate, via at least one processor, an access notification indicating that the temporary mailbox environment is ready.

17. The medium of embodiment 16, wherein the user is an administrative user, and wherein the available mailbox backup data includes mailbox backup data for a plurality of other users.

18. The medium of embodiment 16, wherein the instructions to obtain the selection of the subset of the available mailbox backup data to recover further comprise instructions to:
obtain, via at least one processor, a search term;
filter, via at least one processor, the available mailbox backup data using the search term; and
obtain, via a user interface, the selection of the subset of the available mailbox backup data to recover from the filtered available mailbox backup data.

19. The medium of embodiment 16, wherein the selection of the subset of the available mailbox backup data to recover includes a selection of one or more mailbox accounts.

20. The medium of embodiment 16, wherein the selection of the subset of the available mailbox backup data to recover includes a snapshot selection.

21. The medium of embodiment 16, wherein the selection of the subset of the available mailbox backup data to recover includes a selection of one or more mailbox data items.

22. The medium of embodiment 16, wherein a mailbox data item is one of: a folder, an email, a calendar entry, a contact, a task, a note.

23. The medium of embodiment 16, wherein the instructions to spawn the temporary mailbox environment further comprise instructions to provision a new temporary mailbox environment associated with the mailbox data recovery request datastructure.

24. The medium of embodiment 23, wherein the instructions to provision the new temporary mailbox environment further comprise instructions to launch a virtual machine executing an Exchange server.

25. The medium of embodiment 16, wherein the instructions to spawn the temporary mailbox environment further comprise instructions to allocate capacity, associated with the mailbox data recovery request datastructure, on an existing temporary mailbox environment.

26. The medium of embodiment 25, wherein the existing temporary mailbox environment is configured to host mailboxes associated with a specified entity associated with the user.

27. The medium of embodiment 16, further, comprising:
the temporary mailbox environment provisioning component, stored in the medium, includes processor-issuable instructions to:
generate, via at least one processor, a random password satisfying a set of password strength criteria; and
assign, via at least one processor, the generated password to the created mailbox.

28. The medium of embodiment 16, wherein the access notification includes a hyperlink facilitating access to the created mailbox on the temporary mailbox environment.

29. The medium of embodiment 23, further, comprising:
the temporary mailbox environment provisioning component, stored in the medium, includes processor-issuable instructions to:

determine, via at least one processor, that a lifetime associated with the temporary mailbox environment has expired; and terminate, via at least one processor, the new temporary mailbox environment.

30. The medium of embodiment 25, further, comprising:

the temporary mailbox environment provisioning component, stored in the medium, includes processor-issuable instructions to:

determine, via at least one processor, that a lifetime associated with the temporary mailbox environment has expired; and deallocate, via at least one processor, capacity associated with the mailbox data recovery request datastructure from the existing temporary mailbox environment.

31. A processor-implemented temporary mailbox environment provisioning system, comprising:

a temporary mailbox environment provisioning component means, to:

obtain, via at least one processor, a mailbox data recovery request datastructure associated with a user;

determine, via at least one processor, available mailbox backup data accessible to the user;

obtain, via a user interface, a selection of a subset of the available mailbox backup data to recover;

spawn, via at least one processor, a temporary mailbox environment associated with the mailbox data recovery request datastructure;

create, via at least one processor, a mailbox, corresponding to a mailbox account included in the selected subset of the available mailbox backup data, on the temporary mailbox environment;

restore, via at least one processor, mailbox data items, corresponding to mailbox data items associated with the mailbox account that are included in the selected subset of the available mailbox backup data, to the created mailbox; and generate, via at least one processor, an access notification indicating that the temporary mailbox environment is ready.

32. The system of embodiment 31, wherein the user is an administrative user, and wherein the available mailbox backup data includes mailbox backup data for a plurality of other users.

33. The system of embodiment 31, wherein the means to obtain the selection of the subset of the available mailbox backup data to recover further comprise means to:

obtain, via at least one processor, a search term;

filter, via at least one processor, the available mailbox backup data using the search term; and obtain, via a user interface, the selection of the subset of the available mailbox backup data to recover from the filtered available mailbox backup data.

34. The system of embodiment 31, wherein the selection of the subset of the available mailbox backup data to recover includes a selection of one or more mailbox accounts.

35. The system of embodiment 31, wherein the selection of the subset of the available mailbox backup data to recover includes a snapshot selection.

36. The system of embodiment 31, wherein the selection of the subset of the available mailbox backup data to recover includes a selection of one or more mailbox data items.

37. The system of embodiment 31, wherein a mailbox data item is one of: a folder, an email, a calendar entry, a contact, a task, a note.

38. The system of embodiment 31, wherein the means to spawn the temporary mailbox environment further comprise means to provision a new temporary mailbox environment associated with the mailbox data recovery request datastructure.

39. The system of embodiment 38, wherein the means to provision the new temporary mailbox environment further comprise means to launch a virtual machine executing an Exchange server.

40. The system of embodiment 31, wherein the means to spawn the temporary mailbox environment further comprise means to allocate capacity, associated with the mailbox data recovery request datastructure, on an existing temporary mailbox environment.

41. The system of embodiment 40, wherein the existing temporary mailbox environment is configured to host mailboxes associated with a specified entity associated with the user.

42. The system of embodiment 31, further, comprising:

the temporary mailbox environment provisioning component means, to:

generate, via at least one processor, a random password satisfying a set of password strength criteria; and assign, via at least one processor, the generated password to the created mailbox.

43. The system of embodiment 31, wherein the access notification includes a hyperlink facilitating access to the created mailbox on the temporary mailbox environment.

44. The system of embodiment 38, further, comprising:

the temporary mailbox environment provisioning component means, to:

determine, via at least one processor, that a lifetime associated with the temporary mailbox environment has expired; and terminate, via at least one processor, the new temporary mailbox environment.

45. The system of embodiment 40, further, comprising:

the temporary mailbox environment provisioning component means, to:

determine, via at least one processor, that a lifetime associated with the temporary mailbox environment has expired; and deallocate, via at least one processor, capacity associated with the mailbox data recovery request datastructure from the existing temporary mailbox environment.

46. A processor-implemented temporary mailbox environment provisioning method, comprising:

executing processor-implemented temporary mailbox environment provisioning component instructions to:

obtain, via at least one processor, a mailbox data recovery request datastructure associated with a user;

determine, via at least one processor, available mailbox backup data accessible to the user;

obtain, via a user interface, a selection of a subset of the available mailbox backup data to recover;

spawn, via at least one processor, a temporary mailbox environment associated with the mailbox data recovery request datastructure;

create, via at least one processor, a mailbox, corresponding to a mailbox account included in the selected subset of the available mailbox backup data, on the temporary mailbox environment;

restore, via at least one processor, mailbox data items, corresponding to mailbox data items associated with the mailbox account that are included in the selected subset of the available mailbox backup data, to the created mailbox; and
generate, via at least one processor, an access notification indicating that the temporary mailbox environment is ready.
47. The method of embodiment 46, wherein the user is an administrative user, and wherein the available mailbox backup data includes mailbox backup data for a plurality of other users.
48. The method of embodiment 46, wherein the instructions to obtain the selection of the subset of the available mailbox backup data to recover further comprise instructions to:
obtain, via at least one processor, a search term;
filter, via at least one processor, the available mailbox backup data using the search term; and
obtain, via a user interface, the selection of the subset of the available mailbox backup data to recover from the filtered available mailbox backup data.
49. The method of embodiment 46, wherein the selection of the subset of the available mailbox backup data to recover includes a selection of one or more mailbox accounts.
50. The method of embodiment 46, wherein the selection of the subset of the available mailbox backup data to recover includes a snapshot selection.
51. The method of embodiment 46, wherein the selection of the subset of the available mailbox backup data to recover includes a selection of one or more mailbox data items.
52. The method of embodiment 46, wherein a mailbox data item is one of: a folder, an email, a calendar entry, a contact, a task, a note.
53. The method of embodiment 46, wherein the instructions to spawn the temporary mailbox environment further comprise instructions to provision a new temporary mailbox environment associated with the mailbox data recovery request datastructure.
54. The method of embodiment 53, wherein the instructions to provision the new temporary mailbox environment further comprise instructions to launch a virtual machine executing an Exchange server.
55. The method of embodiment 46, wherein the instructions to spawn the temporary mailbox environment further comprise instructions to allocate capacity, associated with the mailbox data recovery request datastructure, on an existing temporary mailbox environment.
56. The method of embodiment 55, wherein the existing temporary mailbox environment is configured to host mailboxes associated with a specified entity associated with the user.
57. The method of embodiment 46, further, comprising:
executing processor-implemented temporary mailbox environment provisioning component instructions to:
generate, via at least one processor, a random password satisfying a set of password strength criteria; and
assign, via at least one processor, the generated password to the created mailbox.
58. The method of embodiment 46, wherein the access notification includes a hyperlink facilitating access to the created mailbox on the temporary mailbox environment.
59. The method of embodiment 53, further, comprising:
executing processor-implemented temporary mailbox environment provisioning component instructions to:
determine, via at least one processor, that a lifetime associated with the temporary mailbox environment has expired; and
terminate, via at least one processor, the new temporary mailbox environment.
60. The method of embodiment 55, further, comprising:
executing processor-implemented temporary mailbox environment provisioning component instructions to:
determine, via at least one processor, that a lifetime associated with the temporary mailbox environment has expired; and
deallocate, via at least one processor, capacity associated with the mailbox data recovery request datastructure from the existing temporary mailbox environment.

In order to address various issues and advance the art, the entirety of this application for On-demand Virtualized Data Recovery Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivative thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a OVDR individual and/or enterprise user, database configuration and/or relational model, data type, data transmission and/or network framework, syntax structure, and/or the like, various embodiments of the OVDR, may be implemented that allow a great deal of flexibility and customization. For example, aspects of the OVDR may be adapted for non-Exchange based solutions such as Google G Suite. While various embodiments and discussions of the OVDR have included backup systems, however, it is to be understood that the embodiments described herein may be readily configured and/or customized for a wide variety of other applications and/or implementations.

What is claimed is:

1. A temporary mailbox environment provisioning apparatus, comprising:
    a memory;
    a component collection in the memory, including:
        a temporary mailbox environment provisioning component;
    a processor disposed in communication with the memory, and configured to issue a plurality of processing instructions from the component collection stored in the memory,
        wherein the processor issues instructions from the temporary mailbox environment provisioning component, stored in the memory, to:
            obtain, via at least one processor, a mailbox data recovery request datastructure associated with a user;
            determine, via at least one processor, available mailbox backup data accessible to the user;
            obtain, via a user interface, a selection of a subset of the available mailbox backup data to recover;
            spawn, via at least one processor, a temporary mailbox environment associated with the mailbox data recovery request datastructure;
            create, via at least one processor, a mailbox, corresponding to a mailbox account included in the selected subset of the available mailbox backup data, on the temporary mailbox environment;
            restore, via at least one processor, mailbox data items, corresponding to mailbox data items associated with the mailbox account that are included in the selected subset of the available mailbox backup data, to the created mailbox; and
            generate, via at least one processor, an access notification indicating that the temporary mailbox environment is ready.

2. The apparatus of claim 1, wherein the user is an administrative user, and wherein the available mailbox backup data includes mailbox backup data for a plurality of other users.

3. The apparatus of claim 1, wherein the instructions to obtain the selection of the subset of the available mailbox backup data to recover further comprise instructions to:
    obtain, via at least one processor, a search term;
    filter, via at least one processor, the available mailbox backup data using the search term; and
    obtain, via a user interface, the selection of the subset of the available mailbox backup data to recover from the filtered available mailbox backup data.

4. The apparatus of claim 1, wherein the selection of the subset of the available mailbox backup data to recover includes a selection of one or more mailbox accounts.

5. The apparatus of claim 1, wherein the selection of the subset of the available mailbox backup data to recover includes a snapshot selection.

6. The apparatus of claim 1, wherein the selection of the subset of the available mailbox backup data to recover includes a selection of one or more mailbox data items.

7. The apparatus of claim 1, wherein a mailbox data item is one of: a folder, an email, a calendar entry, a contact, a task, a note.

8. The apparatus of claim 1, wherein the instructions to spawn the temporary mailbox environment further comprise instructions to provision a new temporary mailbox environment associated with the mailbox data recovery request datastructure.

9. The apparatus of claim 8, wherein the instructions to provision the new temporary mailbox environment further comprise instructions to launch a virtual machine executing an Exchange server.

10. The apparatus of claim 8, further, comprising:
    the processor issues instructions from the temporary mailbox environment provisioning component, stored in the memory, to:
        determine, via the processor, that a lifetime associated with the temporary mailbox environment has expired; and
        terminate, via the processor, the new temporary mailbox environment.

11. The apparatus of claim 1, wherein the instructions to spawn the temporary mailbox environment further comprise instructions to allocate capacity, associated with the mailbox data recovery request datastructure, on an existing temporary mailbox environment.

12. The apparatus of claim 11, wherein the existing temporary mailbox environment is configured to host mailboxes associated with a specified entity associated with the user.

13. The apparatus of claim 11, further, comprising:
    the processor issues instructions from the temporary mailbox environment provisioning component, stored in the memory, to:
        determine, via the processor, that a lifetime associated with the temporary mailbox environment has expired; and deallocate, via the processor, capacity associated with the mailbox data recovery request datastructure from the existing temporary mailbox environment.

14. The apparatus of claim 1, further, comprising:
the processor issues instructions from the temporary mailbox environment provisioning component, stored in the memory, to:
generate, via the processor, a random password satisfying a set of password strength criteria; and
assign, via the processor, the generated password to the created mailbox.

15. The apparatus of claim 1, wherein the access notification includes a hyperlink facilitating access to the created mailbox on the temporary mailbox environment.

16. A processor-readable temporary mailbox environment provisioning non-transient physical medium storing processor-executable components, the components, comprising:
a component collection stored in the medium, including:
a temporary mailbox environment provisioning component;
wherein the temporary mailbox environment provisioning component, stored in the medium, includes processor-issuable instructions to:
obtain, via at least one processor, a mailbox data recovery request datastructure associated with a user;
determine, via at least one processor, available mailbox backup data accessible to the user;
obtain, via a user interface, a selection of a subset of the available mailbox backup data to recover;
spawn, via at least one processor, a temporary mailbox environment associated with the mailbox data recovery request datastructure;
create, via at least one processor, a mailbox, corresponding to a mailbox account included in the selected subset of the available mailbox backup data, on the temporary mailbox environment;
restore, via at least one processor, mailbox data items, corresponding to mailbox data items associated with the mailbox account that are included in the selected subset of the available mailbox backup data, to the created mailbox; and
generate, via at least one processor, an access notification indicating that the temporary mailbox environment is ready.

17. A processor-implemented temporary mailbox environment provisioning system, comprising:
means to store a component collection;
means to process processor-executable instructions from the component collection, the component collection executable to structured with processor-executable instructions including:
obtain, via at least one processor, a mailbox data recovery request datastructure associated with a user;
determine, via at least one processor, available mailbox backup data accessible to the user;
obtain, via a user interface, a selection of a subset of the available mailbox backup data to recover;
spawn, via at least one processor, a temporary mailbox environment associated with the mailbox data recovery request datastructure;
create, via at least one processor, a mailbox, corresponding to a mailbox account included in the selected subset of the available mailbox backup data, on the temporary mailbox environment;
restore, via at least one processor, mailbox data items, corresponding to mailbox data items associated with the mailbox account that are included in the selected subset of the available mailbox backup data, to the created mailbox; and
generate, via at least one processor, an access notification indicating that the temporary mailbox environment is ready.

18. A processor-implemented temporary mailbox environment provisioning method, comprising:
executing processor-implemented temporary mailbox environment provisioning component instructions to:
obtain, via at least one processor, a mailbox data recovery request datastructure associated with a user;
determine, via at least one processor, available mailbox backup data accessible to the user;
obtain, via a user interface, a selection of a subset of the available mailbox backup data to recover;
spawn, via at least one processor, a temporary mailbox environment associated with the mailbox data recovery request datastructure;
create, via at least one processor, a mailbox, corresponding to a mailbox account included in the selected subset of the available mailbox backup data, on the temporary mailbox environment;
restore, via at least one processor, mailbox data items, corresponding to mailbox data items associated with the mailbox account that are included in the selected subset of the available mailbox backup data, to the created mailbox; and
generate, via at least one processor, an access notification indicating that the temporary mailbox environment is ready.

\* \* \* \* \*